(12) United States Patent
Wu

(10) Patent No.: US 9,407,468 B2
(45) Date of Patent: Aug. 2, 2016

(54) CHANNEL ESTIMATING APPARATUS, CHANNEL ESTIMATING METHOD, BASE STATION, AND COMMUNICATION SYSTEM

(71) Applicant: FUJITSU LIMITED, Kawasaki-shi, Kanagawa (JP)

(72) Inventor: Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 14/141,722

(22) Filed: Dec. 27, 2013

(65) Prior Publication Data
US 2014/0105171 A1    Apr. 17, 2014

Related U.S. Application Data

(60) Division of application No. 13/196,004, filed on Aug. 2, 2011, now abandoned, which is a continuation of application No. PCT/JP2009/051974, filed on Feb. 5, 2009.

(51) Int. Cl.
*H04L 25/02* (2006.01)
*H04L 5/00* (2006.01)

(52) U.S. Cl.
CPC .......... *H04L 25/0202* (2013.01); *H04L 5/0007* (2013.01); *H04L 5/0048* (2013.01); *H04L 25/023* (2013.01)

(58) Field of Classification Search
CPC . H04L 25/0202; H04L 25/023; H04L 5/0007; H04L 5/0048
USPC ........................ 455/517, 73, 552.1
See application file for complete search history.

(56) References Cited

U.S. PATENT DOCUMENTS 6,947,373 B2    9/2005    Siala et al.
7,362,695 B2    4/2008    Akahori
(Continued)

FOREIGN PATENT DOCUMENTS

JP    2004-509520    3/2004
JP    2004-112588    4/2004
(Continued)

OTHER PUBLICATIONS

International Search Report dated Mar. 10, 2009, from corresponding International Application No. PCT/JP2009/051974.
(Continued)

*Primary Examiner* — Ping Hsieh
*Assistant Examiner* — Xin Jia
(74) *Attorney, Agent, or Firm* — Katten Muchin Rosenman LLP

(57) ABSTRACT

A channel estimating apparatus includes a receiver that receives reference signal groups that are respectively transmitted from wireless communications units and that each include a reference signal that is allocated a common channel resource allocated to a reference signal in another reference signal group; a first estimating unit that based on a reference signal that is in a first reference signal group among the received reference signal groups and that is allocated a unique channel resource not allocated to a reference signal in another reference signal group, estimates a reference signal that is in the first reference signal group and allocated the common channel resource; and a second estimating unit that based on the reference signal estimated by the first estimating unit, estimates a reference signal that is in a second reference signal group among the received reference signal groups and that is allocated the common channel resource.

4 Claims, 19 Drawing Sheets

(56) References Cited

U.S. PATENT DOCUMENTS

| | | | |
|---|---|---|---|
| 7,463,673 | B2 | 12/2008 | Fujii et al. |
| 2003/0016645 | A1 | 1/2003 | Siala et al. |
| 2004/0131007 | A1 | 7/2004 | Smee et al. |
| 2005/0190821 | A1 | 9/2005 | Fujii et al. |
| 2005/0254450 | A1 | 11/2005 | Ito et al. |
| 2006/0007906 | A1 | 1/2006 | Akahori |
| 2007/0008873 | A1 | 1/2007 | Stopler |
| 2010/0103906 | A1* | 4/2010 | Montojo et al. ............ 370/335 |
| 2011/0086654 | A1* | 4/2011 | Larsson ............ H04B 7/0417 455/501 |
| 2013/0094389 | A1* | 4/2013 | Parkvall et al. ............ 370/252 |

FOREIGN PATENT DOCUMENTS

| | | |
|---|---|---|
| JP | 2005-229524 | 8/2005 |
| JP | 2006-33083 | 2/2006 |
| WO | 2008/057898 | 5/2008 |
| WO | 2008-127185 A1 | 10/2008 |

OTHER PUBLICATIONS

3GPP TS 36.211 V8.3.0 3rd Generation Partnership Project; Technical Specification Group Radio Access Network; Evolved Universal Terrestrial Radio Access (E-UTRA); Physical Channels and Modulation (Release 8), May 2008.

3GPP TR 36.913 V8.0.0 3rd Generation Partnership Project; Technical Specification Group Radio Access Network; Requirements for Further Advancements for E-UTRA (LTE-Advanced) (Release 8), Jun. 2008.

China Mobile, Vodafone, Huawei. "Application Scenarios for LTE-Advanced Relay" TSG-RAN WG1 #54, Aug. 18-22, 2008.

Alcatel Shanghai Bell, Alcatel Lucent. "Collaborative MIMO for LTE-A Downlink" 3GPP TSG RAN WG1 Meeting #53bis, Jun. 30-Jul. 4, 2008.

Texas Instruments. "Network MIMO Precoding" 3GPP TSG RAN WG1 #53bis, Jun. 30-Jul. 4, 2008.

Peter Hoeher, et al. "Two-Dimensional Pilot-Symbol-Aided Channel Estimation by Wiener Filtering", Institute for Communications Technology, IEEE, pp. 1845-1848, 1997.

Michael P. Ekstrom. "Realizable Wiener Filtering in Two Dimensions" IEEE Transactions on Acoustics, Speech, and Signal Processing, vol. ASSP-30, No. 1, Feb. 1982, pp. 31-40.

Alcatel-Lucent, et al. "Text Proposal for Evaluation Methodology" 3GPP TSG-RAN WG1 #54bis, Sep. 29-Oct. 3, 2008.

International Preliminary Report on Patentability and Written Opinion of the International Searching Authority dated Sep. 13, 2011, from corresponding International Application No. PCT/JP2009/051974.

United States Office Action dated Apr. 18, 2013, from corresponding U.S. Appl. No. 13/196,004.

Notice of Rejection dated Apr. 23, 2013, from corresponding Japanese Application No. 2010-549311.

ZTE. "Consideration on COMP antenna port mapping in LTE-A" 3GPP TSG RAN WG1 Meeting #54bis, R1-083611, Oct. 3, 2008, retrieved from http://www.3gpp.org/ftp/tsg_ran/wg1_rl1/TSGR1_54b/Docs/R1-083611.zip.

United States Office Action dated May 21, 2013, from corresponding U.S. Appl. No. 13/196,004.

Chinese First Office Action dated Jun. 24, 2013, from corresponding Chinese Application No. 200980156082.6.

United States Office Action dated Oct. 11, 2013, from corresponding U.S. Appl. No. 13/196,004.

Extended European Search Report of European Patent Application 09839648.4 dated Feb. 9, 2015.

Fujitsu "Pseudo Transmission Timing Control using Cyclic Shift for Downlink CoMP Joint Transmission" 3GPP Draft, R1-090951, 3rd Generation Partnership Project (3GPP), Mobile Competence Centre, 650, Route Des Lucioles; F-06921 Sophia-Antipolis Cedex; France, No. Athens, Greece, Feb. 4, 2009 XP050318790.

U.S. Office Action dated Mar. 28, 2014 from corresponding U.S. Appl. No. 13/196,004.

United States Office Action dated Jan. 7, 2014, from corresponding U.S. Appl. No. 13/196,004.

* cited by examiner

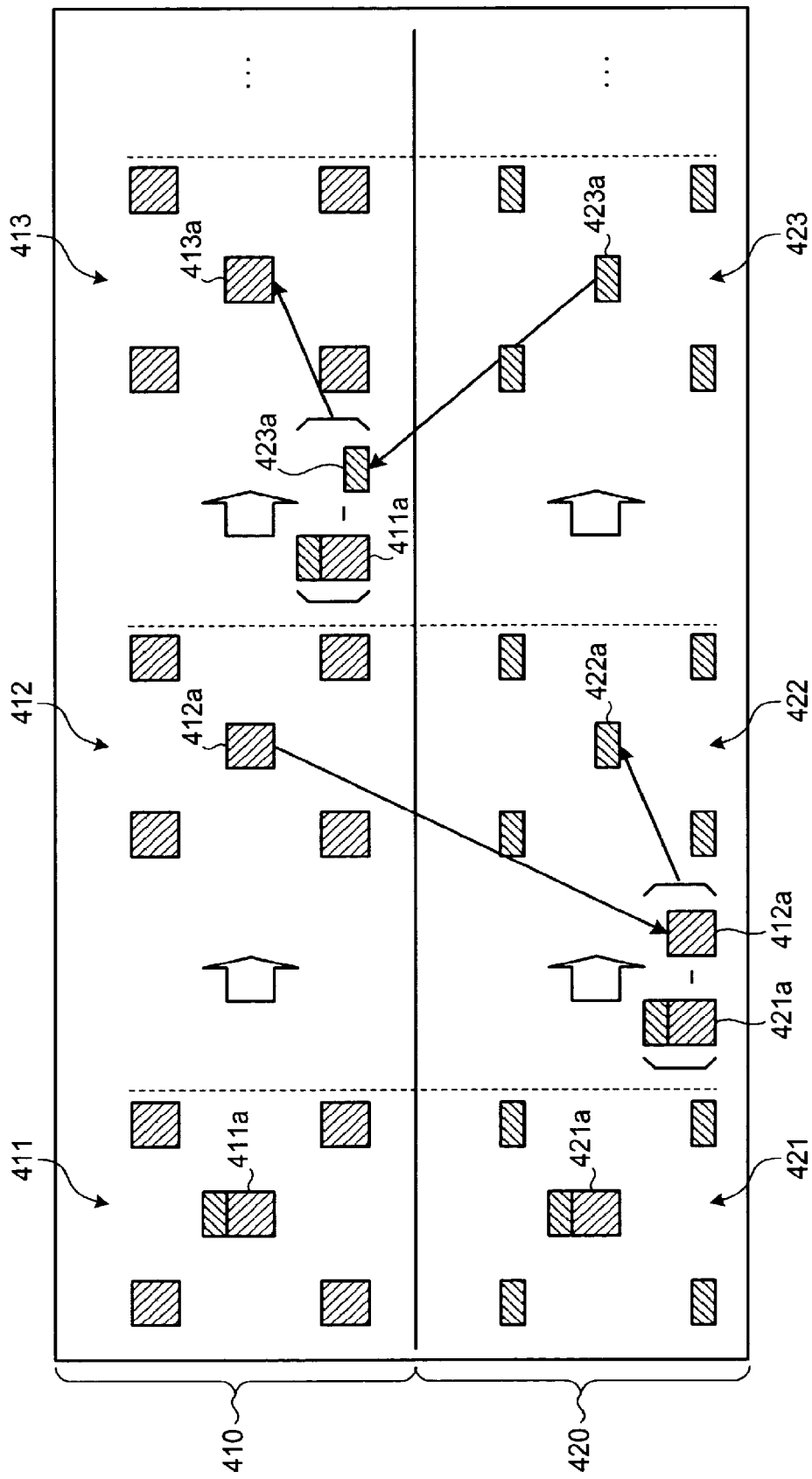

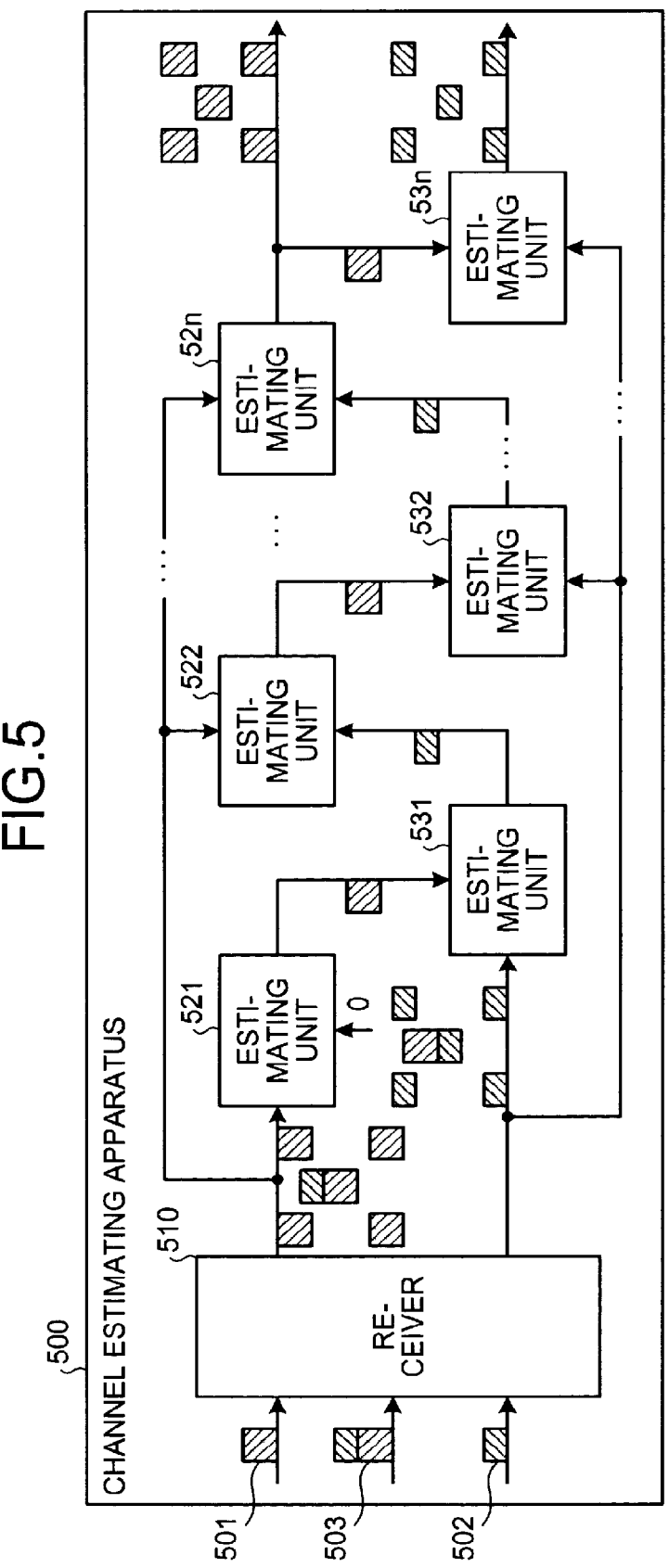

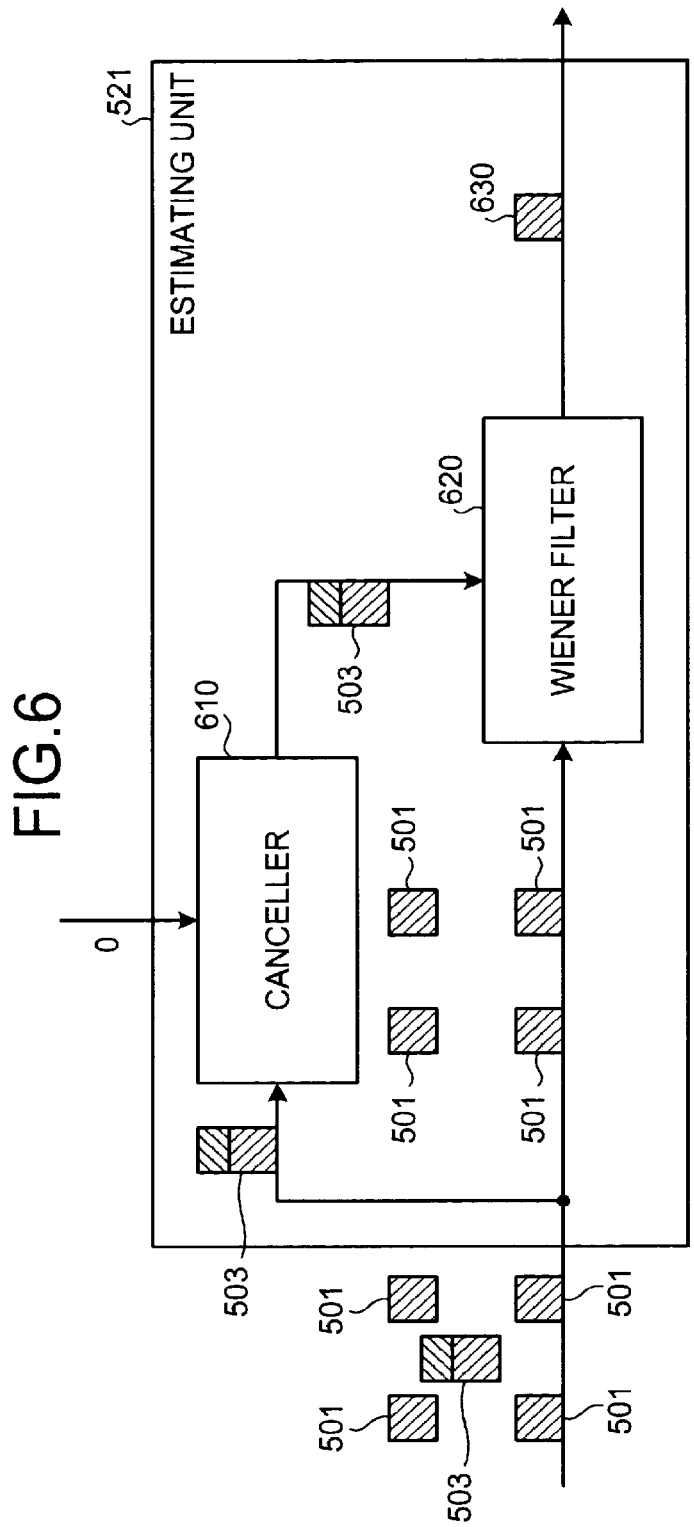

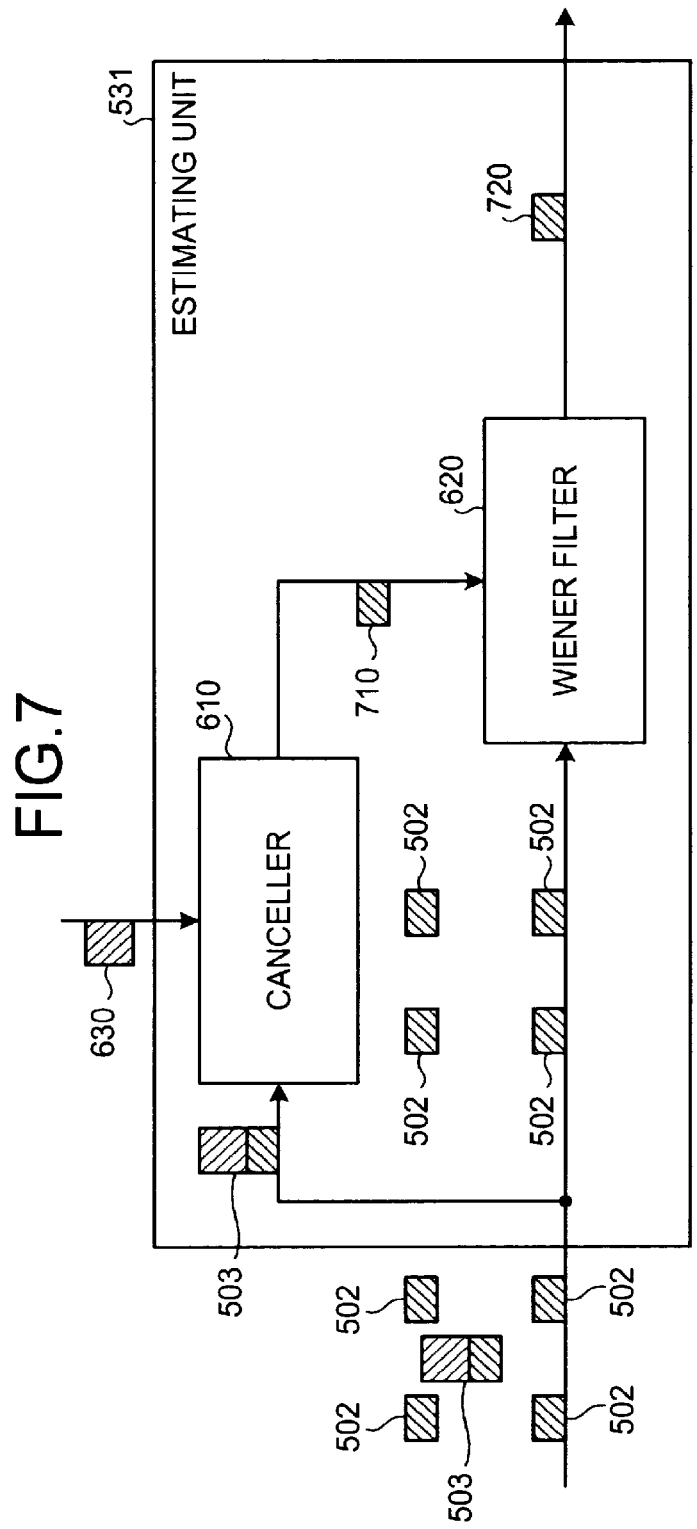

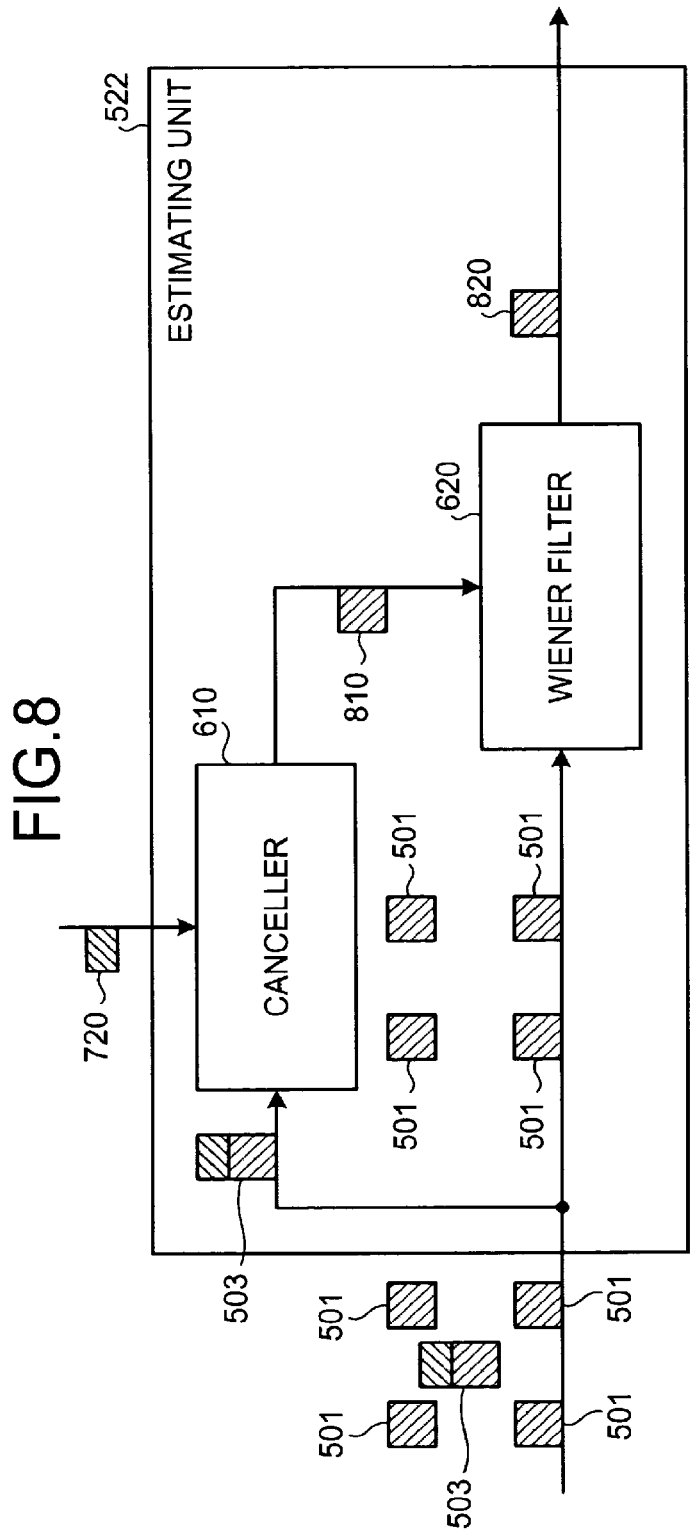

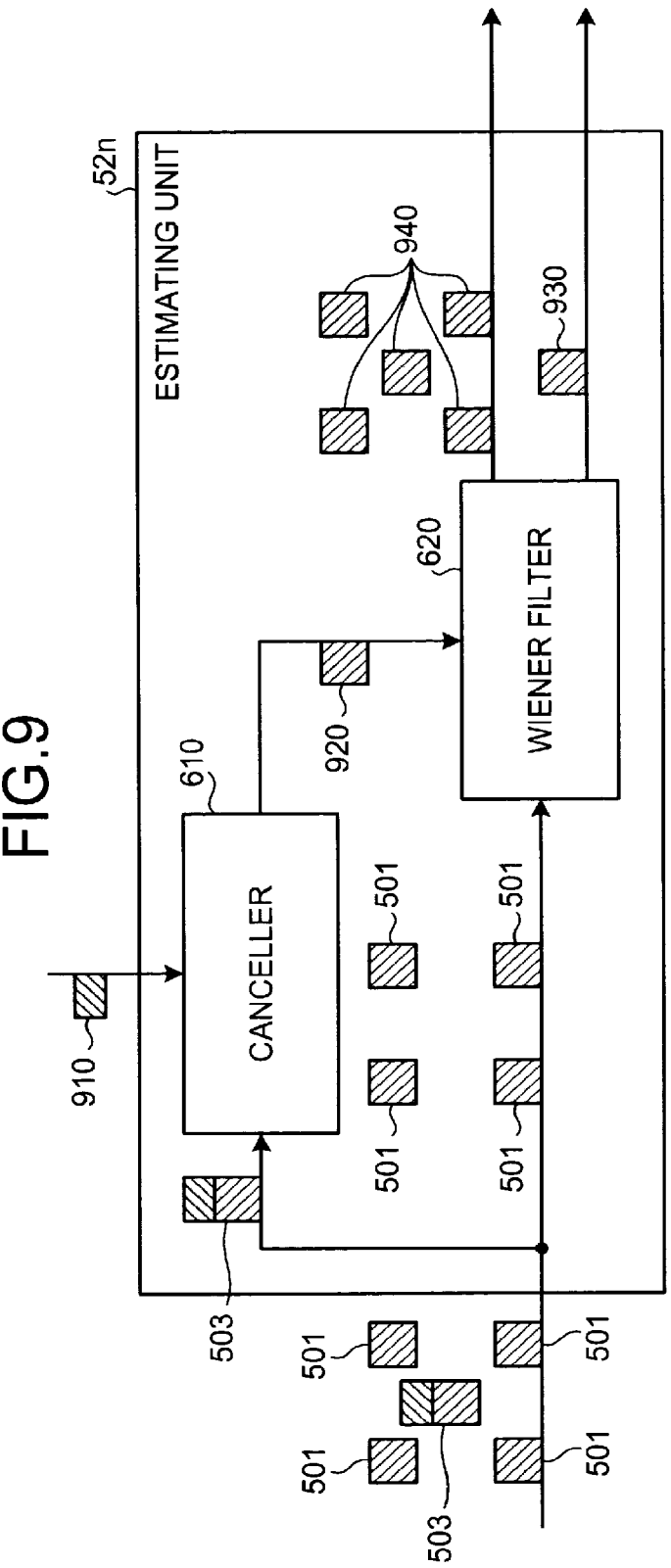

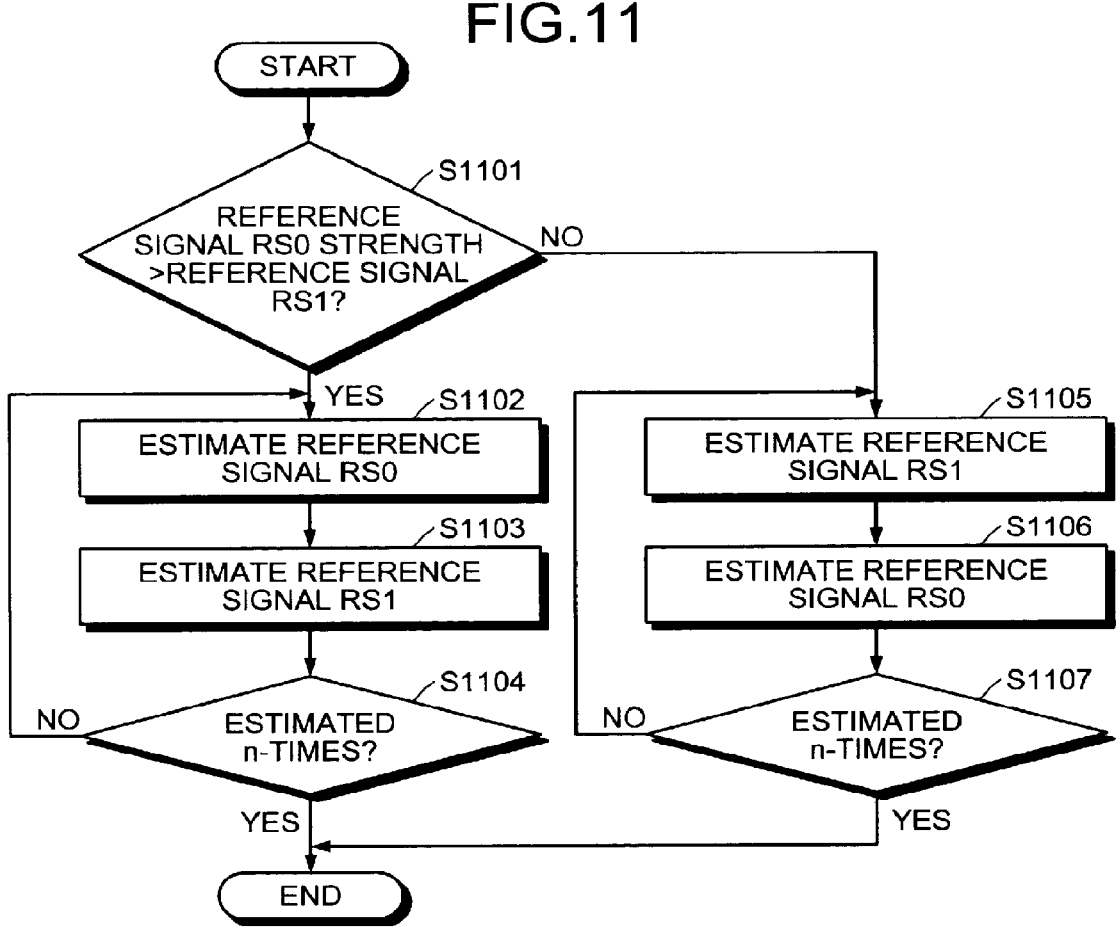

CHANNEL ESTIMATING APPARATUS, CHANNEL ESTIMATING METHOD, BASE STATION, AND COMMUNICATION SYSTEM

CROSS REFERENCE TO THE RELATED APPLICATIONS

This application is a divisional of U.S. application Ser. No. 13/196,004 filed on Aug. 2, 2011, which is a continuation application of International Application PCT/JP2009/051974, filed Feb. 5, 2009, and designating the U.S., the entire contents of which are incorporated herein by reference.

FIELD

The embodiments discussed herein are related to channel estimation.

BACKGROUND

In orthogonal frequency division multiplexing (OFDM) systems such as long term evolution (LTE) systems, reference signals (RS), which are shared links, are used for channel estimation.

For example, a wireless relay system has been disclosed that uses a wireless relay apparatus to relay a wireless signal from a first wireless station and transmit the wireless signal to a second wireless station. The wireless relay apparatus includes a phase correction amount determining unit that based on channel information related to the transmission path between the first wireless station, the second wireless station, and the wireless relay apparatus, determines the amount of phase correction for the relayed signal; and a phase correcting unit that corrects the phase of the relayed signal, based on the phase correction amount determined by the phase correction amount determining unit (see, for example, Japanese Laid-Open Patent Publication No. 2005-229524).

However, with the conventional technology above, a problem arises in that if the channel resources for reference signals transmitted from multiple points to terminal apparatuses are the same, channel estimation becomes difficult. A further problem arises in that if the reference signals transmitted from multiple points to terminal apparatuses are allocated channel resources so as to prevent the reference signals from being allocated a common (i.e., the same) channel resource, the number of channel resources used for allocation to reference signals increases, whereby channel resource utilization efficiency decreases.

SUMMARY

It is an object in one aspect of the embodiments to at least solve the above problems in the conventional technologies.

According to an aspect of an embodiment, a channel estimating apparatus includes a receiver that receives reference signal groups that are respectively transmitted from wireless communications units and that each include a reference signal that is allocated a common channel resource allocated to a reference signal in another reference signal group among the reference signal groups; a first estimating unit that based on a reference signal that is in a first reference signal group among the reference signal groups received by the receiver and that is allocated a unique channel resource not allocated to a reference signal in another reference signal group, estimates a reference signal that is in the first reference signal group and allocated the common channel resource; and a second estimating unit that based on the reference signal estimated by the first estimating unit, estimates a reference signal that is in a second reference signal group among the received reference signal groups and that is allocated the common channel resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram depicting a detailed example of channel estimation by each estimating unit.

FIG. 5 is a block diagram of a configuration for implementing the channel estimation depicted in FIG. 4.

FIG. 6 is a block diagram of a configuration of an estimating unit 521 depicted in FIG. 5.

FIG. 7 is a block diagram of a configuration of an estimating unit 531 depicted in FIG. 5.

FIG. 8 is a block diagram of an estimating unit 522 depicted in FIG. 5.

FIG. 9 is a block diagram of a configuration of an estimating unit 52n depicted in FIG. 5.

FIG. 11 is a flowchart depicting an operation example of a channel estimating apparatus depicted in FIG. 5.

DESCRIPTION OF EMBODIMENTS

Preferred embodiments of the present invention will be explained with reference to the accompanying drawings.

Figure 1:
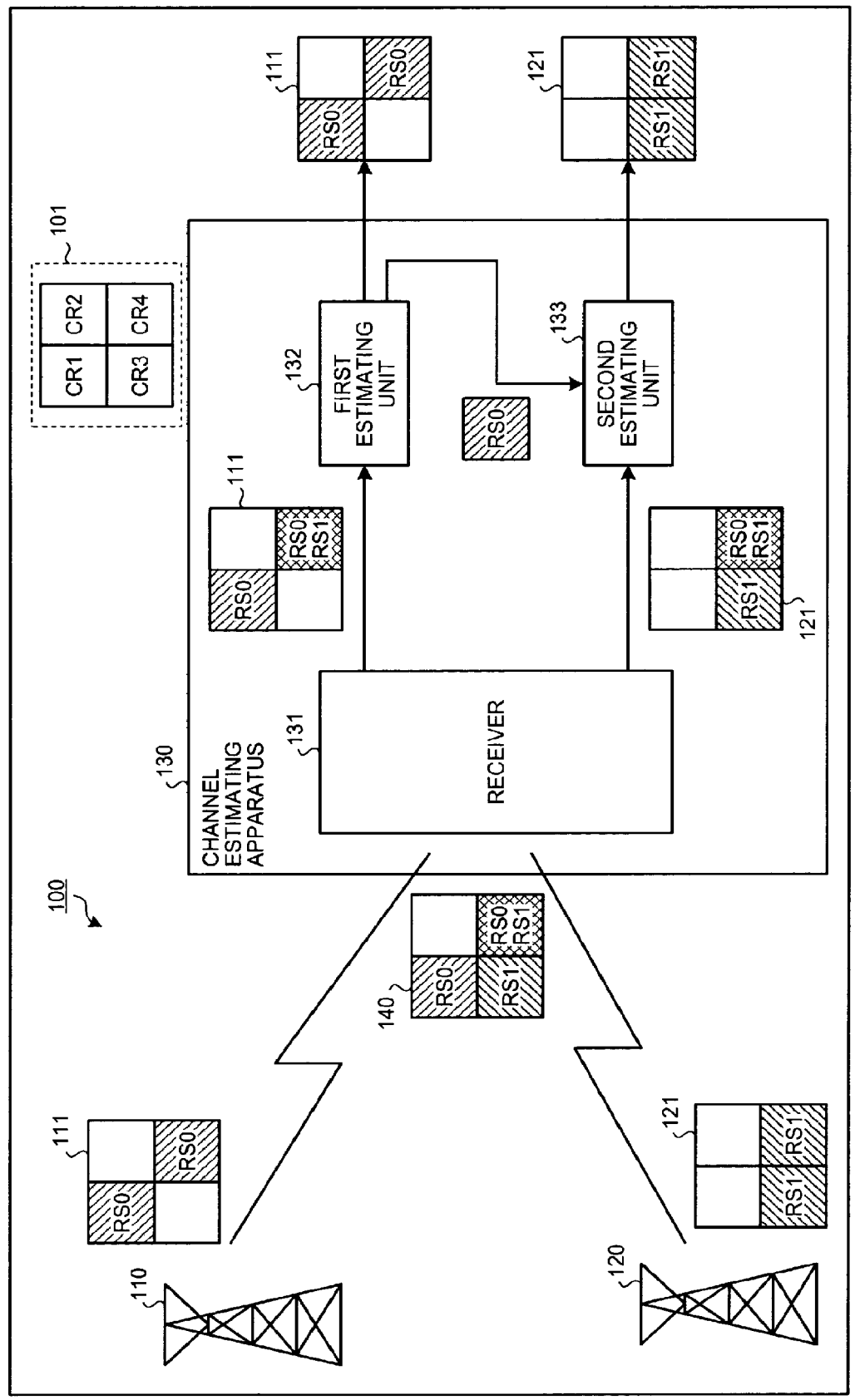
FIG. 1 is a block diagram of a communication system according to an embodiment.

FIG. 1 is a block diagram of a communication system according to an embodiment. As depicted in FIG. 1, a communication system 100 according to the embodiment includes a base station 110, a base station 120, and a channel estimating apparatus 130. As depicted by reference numeral 101 in FIG. 1, an example will be described where 4 channel resources CR1 to CR4 depicted in a grid pattern are allocated to various types of signals that are transmitted from the base station 110 and the base station 120.

The base station 110 wirelessly transmits a reference signal group 111 to the channel estimating apparatus 130. Channel resource CR1 and channel resource CR4 are allocated to reference signal RS0 in the reference signal group 111. The base station 120 wirelessly transmits a reference signal group 121 to the channel estimating apparatus 130. Channel resource CR3 and channel resource CR4 are allocated to reference signal RS1 in the reference signal group 121.

In this manner, the reference signal group 111 and the reference signal group 121 include reference signals that have been allocated the same channel resource. For example, channel resource CR4 is allocated to reference signal RS0 in the reference signal group 111 and to reference signal RS1 in the reference signal group 121. On the other hand, channel resource CR1 is allocated to reference signal RS0 in the reference signal group 111, but not to reference signal RS1 in the reference signal group 121.

Further, channel resource CR3 is allocated to reference signal RS1 in the reference signal group 121, but not to reference signal RS0 in the reference signal group 111. Channel resource CR2 is allocated to neither reference signal RS0 nor reference signal RS1. Thus, channel resource CR4 is allocated to multiple reference signals, while channel resources CR1 to CR3 are not allocated to multiple reference signals.

The channel estimating apparatus 130 includes a receiver 131, a first estimating unit 132, and a second estimating unit 133. The receiver 131 simultaneously receives the reference signal group 111 and the reference signal group 121 transmitted from the base station 110 and the base station 120. A reference signal group 140 depicts the state of the reference signals received by the receiver 131.

The receiver 131 outputs to the first estimating unit 132, the reference signal group 111 wirelessly transmitted from the base station 110. For example, the receiver 131 extracts from the received reference signal group 140, the respective reference signals at channel resource CR1 and channel resource CR4, which the base station 110 allocated reference signal RS0, and outputs the extracted reference signals to the first estimating unit 132.

However, the reference signal group 140 received by the receiver 131 also includes at channel resource CR4, reference signal RS1, which is wirelessly transmitted from the base station 120. Consequently, the reference signal group 111 output from the receiver 131 to the first estimating unit 132 includes reference signal RS0 and reference signal RS1 at channel resource CR4.

The receiver 131 outputs to the second estimating unit 133, the reference signal group 121 wirelessly transmitted from the base station 120. For example, the receiver 131 extracts from the received reference signal group 140, the respective reference signals at channel resource CR3 and channel resource CR4, which the base station 120 allocated reference signal RS1, and outputs the extracted reference signals to the second estimating unit 133.

However, the reference signal group 140 received by the receiver 131 also includes at channel resource CR4, reference signal RS0, which is wirelessly transmitted from the base station 110. Consequently, the reference signal group 121 output from the receiver 131 to the second estimating unit 133 includes reference signal RS0 and reference signal RS1 at channel resource CR4.

Further, the receiver 131 may output to the first estimating unit 132, the stronger reference signal group among the reference signal group 111 and the reference signal group 121 and may output to the second estimating unit 133, the weaker reference signal group. Here, it is assumed that the strength of the reference signal group 111 is greater than that of the reference signal group 121. In this case, the receiver 131 outputs the reference signal group 111 to the first estimating unit 132 and outputs the reference signal group 121 to the second estimating unit 133.

The first estimating unit 132 estimates a reference signal that is in the reference signal group 111 output from the receiver 131 and allocated a common channel resource that is also allocated to a reference signal in the reference signal group 121. The first estimating unit 132 makes the estimation based on a reference signal that is in the reference signal group 111 and allocated a unique channel resource that is not allocated to a reference signal in the reference signal group 121.

Here, the first estimating unit 132 estimates reference signal RS0 that is in the reference signal group 111 and allocated channel resource CR4. The first estimating unit 132 makes the estimation based on reference signal RS0 that is allocated channel resource CR1. The first estimating unit 132 uses channel resource CR4 of the reference signal group 111 from the receiver 131 for the estimated reference signal RS0, outputs the reference signal group 111 downstream. The first estimating unit 132 further outputs the estimated reference signal RS0 to the second estimating unit 133.

The second estimating unit 133 estimates a reference signal that is in the reference signal group 121 output from the receiver 131 and allocated a common channel resource that is also allocated to a reference signal in the reference signal group 111. The second estimating unit 133 makes the estimation based on the reference signal RS0 received from the first estimating unit 132. Here, the second estimating unit 133 estimates reference signal RS1 in the reference signal group 121 and allocated channel resource CR4. The second estimating unit 133 makes the estimation based on reference signal RS0 output from the first estimating unit 132.

For example, the second estimating unit 133 subtracts from the signals (including reference signal RS0 and reference signal RS1) of channel resource CR4 of the reference signal group 121, the reference signal RS0 output from the first estimating unit 132, whereby reference signal RS1 allocated channel resource CR4 of the reference signal group 121 is estimated.

The second estimating unit 133 may estimate the reference signal further based on a reference signal that is in the reference signal group 121 and allocated a unique channel resource that is not allocated to a reference signal in the reference signal group 111. For example, based on reference signal RS1 allocated channel resource CR3, the second estimating unit 133 estimates reference signal RS1 allocated channel resource CR4 of the reference signal group 121.

The second estimating unit 133 uses channel resource CR4 of the reference signal group 121 from the receiver 131, for the estimated reference signal RS1, and outputs the reference signal group 121 downstream. Further, the second estimating unit 133 may output the estimated reference signal RS1 to the first estimating unit 132. In this case, the first estimating unit 132 further estimates the estimated reference signal RS0, based on reference signal RS1 output from the second estimating unit 133 (see, for example FIGS. 4 and 5).

Figure 2:
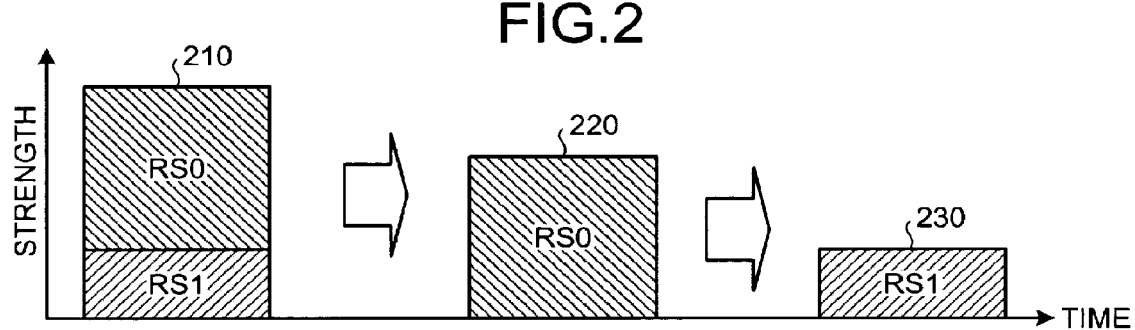
FIG. 2 is a diagram depicting reference signal estimation for channel resource CR4 depicted in FIG. 1.

FIG. 2 is a diagram depicting reference signal estimation for channel resource CR4 depicted in FIG. 1. In FIG. 2, the horizontal axis represents time and the vertical axis represents signal strength at channel resource CR4 depicted in FIG. 1. Signal 210 represents the signal at channel resource CR4 of the reference signal group 140 received by the receiver 131.

Since reference signal RS0 and reference signal RS1 are both allocated channel resource CR4, signal 210 includes reference signal RS0 and reference signal RS1. Consequently, the strength of signal 210 is a sum of the respective strengths of reference signal RS0 and reference signal RS1. Further, the strength of reference signal RS0 is greater than that of reference signal RS1.

Signal 220 represents the reference signal RS0 estimated by the first estimating unit 132. Signal 220, for example, is estimated based on reference signal RS0 at channel resource CR1. Signal 230 the represents reference signal RS1 estimated by the second estimating unit 133. Signal 230 is estimated by subtracting signal 220 from signal 210.

Figure 3A:
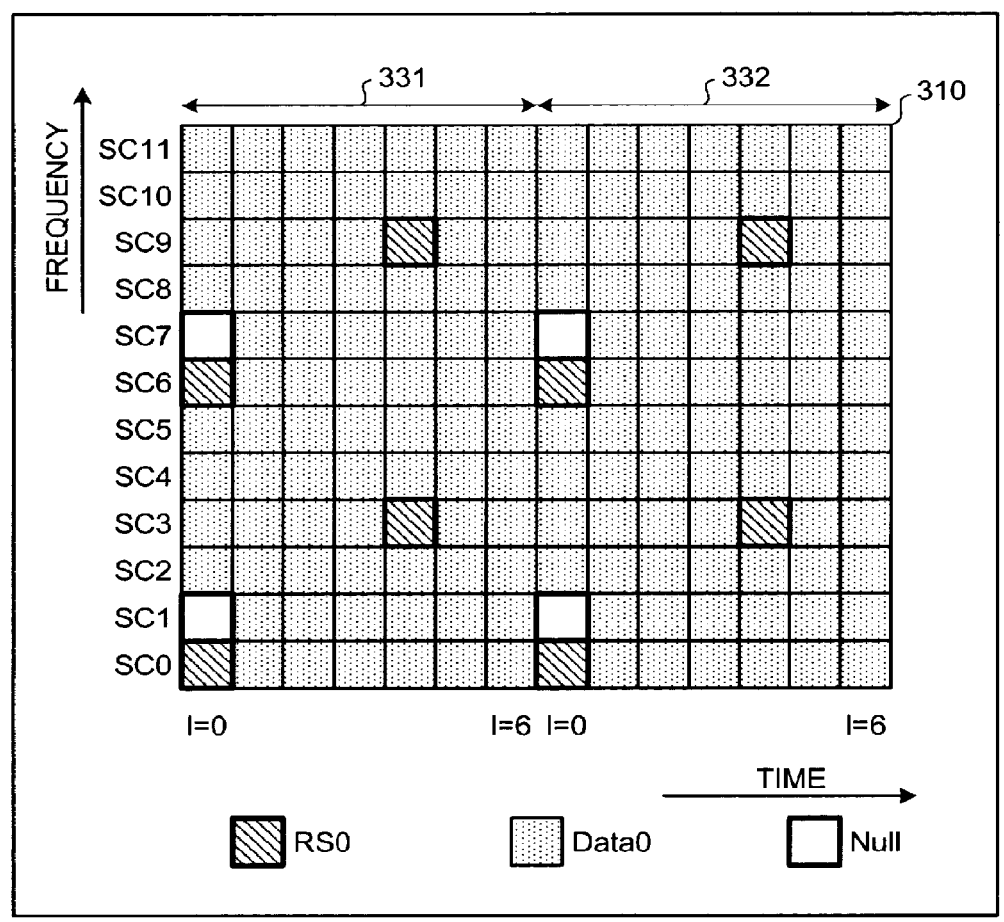
FIG. 3A is a diagram depicting an example of reference signal design (part 1).
Figure 3B:
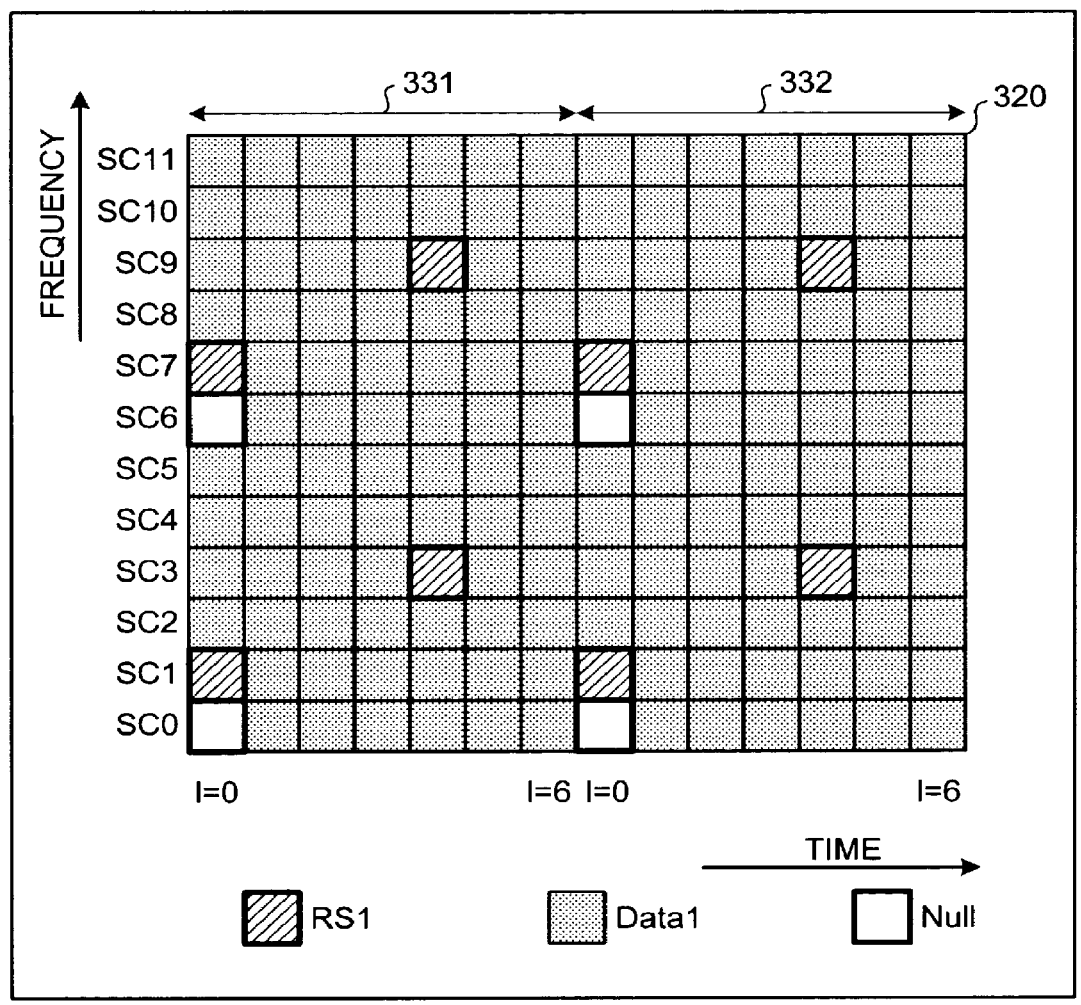
FIG. 3B is a diagram depicting an example of reference signal design (part 2).

FIG. 3A is a diagram depicting an example of reference signal design (part 1). FIG. 3B is a diagram depicting an example of reference signal design (part 2). Signal 310 depicted in FIG. 3A represents a signal transmitted from the base station 110. Signal 320 depicted in FIG. 3B represents a signal transmitted from the base station 120. Signal 310 and signal 320 are respectively allocated channel resources (resource elements) that are divided by a horizontal axis and vertical axis grids.

Here, for example, description will be given concerning channel resource division by OFDM under LTE, however, the communication method is not limited to LTE or OFDM. The horizontal grid depicts channel resource division by time. Along the horizontal axis, time is indicated by cyclically repeating slots l=0 to 6. The vertical grid depicts channel resource division by frequency.

Each subcarrier SC0 to SC11 represents a subcarrier dividing signal 310 and signal 320 by frequency. The subcarriers SC0 to SC11 are transmitted in units, i.e., a sub-frame 331, 332 including slots l=0 to 6.

Each channel resource for signal 310 is allocated to any one among reference signal RS0, a data signal Data0, a null signal Null transmitted by the base station 110. Each channel resource for signal 320 is allocated to any one among reference signal RS1, a data signal Data1, and a null signal (Null) transmitted by the base station 120. A null signal is a signal that conveys neither a reference signal nor a data signal, and that prevents reference signal interference.

In signal 310, reference signal RS0 is allocated slot l=0 of each subcarrier SC0 and SC6 and slot l=4 of each subcarrier SC3 and SC9. Further, in signal 310, a null signal is allocated slot l=0 of each subcarrier SC1 and SC7; and data signal Data0 is allocated channel resources that have been allocated to neither reference signal RS0 of signal 310 nor a null signal.

In signal 320, reference signal RS1 is allocated slot l=0 of each subcarrier SC1 and SC7 and slot l=4 of each subcarrier SC3 and SC9. Further, in signal 320, a null signal is allocated slot l=0 of each subcarrier SC0 and SC6; and data signal Data1 is allocated channel resources that have been allocated to neither reference signal RS1 of signal 320 nor a null signal.

If signal 310 and signal 320 are transmitted simultaneously, reference signal RS0 and reference signal RS1 both use slot l=4 of subcarriers SC3 and SC9. On the other hand, since slot l=0 of each subcarrier SC0 and SC6 is allocated to reference signal RS0 in signal 310 and to a null signal in signal 320, reference signals do not simultaneously use the slot.

Further, since slot l=0 of each subcarrier SC1 and SC7 is allocated to a null signal in signal 310 and to reference signal RS1 in signal 320, reference signals do not simultaneously use the slot. In this manner, the reference signal group of signal 310 and the reference signal group of signal 320 each include a reference signal that uses the same channel resource.

In signal 310 and signal 320, reference signals that are allocated a unique channel resource are allocated channel resources that are orthogonal to one another. For example, in signal 310, reference signal RS0 is allocated subcarrier SC0, whereas in signal 320, reference signal RS1 is allocated subcarrier SC1, which is orthogonal to subcarrier SC0.

Further, in signal 310, reference signal RS0 is allocated subcarrier SC6, whereas in signal 320, reference signal RS1 is allocated subcarrier SC7, which is orthogonal to subcarrier SC6.

Here, in signal 310 and signal 320, reference signals that are allocated a unique channel resource are respectively allocated the head slot of a sub-frame. In other words, reference signal RS0 of signal 310 is allocated slot l=0 and reference signal RS1 of signal 320 is allocated slot l=0.

FIG. 4 is a diagram depicting a detailed example of channel estimation by each estimating unit. In FIG. 4, reference numeral 410 represents estimation (by the first estimating unit 132) of the reference signal group 111 transmitted from the base station 110 (see FIG. 1). Reference numeral 420 represents estimation (by the second estimating unit 133) of the reference signal group 121 transmitted from the base station 120 (see FIG. 1).

Here, among signals 310 and 320 depicted in FIGS. 3A and 3B, a reference signal of 1 sub-frame of subcarriers SC0 to SC7 (1 cycle of slots l=0 to 6) will be described. Furthermore, it is assumed that the strength of signal 310 is greater than that of signal 320. In this case, estimation begins with the estimation of the reference signal group 111 by the first estimating unit 132.

As depicted by reference numeral 411, the reference signal group input to the first estimating unit 132 includes 4 reference signals RS0 and a signal that includes reference signal RS0 as well reference signal RS1 (reference numeral 411a). Meanwhile, as depicted by reference numeral 421, the reference signal group input to the second estimating unit 133 includes 4 reference signals RS1 and a signal that includes reference signal RS1 as well as reference signal RS0 (reference numeral 421a).

The first estimating unit 132 applies Wiener filtering to the input reference signal group. Here, although an example is described where Wiener filtering is used in reference signal estimation, configuration is not limited to Wiener filtering and another type of circuit may be used (the same similarly applies hereinafter). Consequently, as depicted by reference numeral 412, by applying a Wiener filtering weight, the strength of each reference signal in the reference signal group at the first estimating unit 132 is equalized and the noise (reference signal RS1) in the signal depicted by reference numeral 411a is reduced (reference numeral 412a). The resulting reference signal RS0 represented by reference numeral 412a is output to the second estimating unit 133.

The second estimating unit 133 subtracts from the signal represented by reference numeral 421a, reference signal RS0 output from the first estimating unit 132 (reference numeral 412a). Consequently, in the reference signal group at the second estimating unit 133, the signal represented by reference numeral 421a, less the reference signal RS0 component, becomes reference signal RS1 (reference numeral 422a).

The second estimating unit 133 applies Wiener filtering to the reference signal group that includes the resulting reference signal RS1 represented by reference numeral 422a. Consequently, as depicted by reference numeral 423, by applying a Weiner filtering weight, the strength of each reference signal in the reference signal group at the second estimating unit 133 is equalized and reference signal RS0 noise in reference signal RS1 represented by reference numeral 422a is reduced (reference numeral 423a). The reference signal represented by reference numeral 423a is output to the first estimating unit 132.

The first estimating unit 132 subtracts from the signal represented by reference numeral 411a, reference signal RS1 (reference numeral 423a) output from the second estimating unit 133. Consequently, in the reference signal group at the first estimating unit 132, the signal represented by reference numeral 411a, less the reference signal RS1 component, becomes reference signal RS0 (reference numeral 413a).

Reference signal RS1 represented by reference numeral 423a is an extremely accurate estimation of reference signal RS1 by the subtraction of reference signal RS0 represented by reference numeral 422 and the Wiener filtering represented by reference numeral 423. Consequently, noise (reference signal RS1 component) is removed with favorable accuracy from reference signal RS0 (reference numeral 413a) estimated based on reference signal RS1 represented by reference numeral 423a, as compared to reference signal RS0 represented by reference numeral 412a.

Reference signal RS0 represented by reference numeral 413a is output to the second estimating unit 133 and the operation represented by reference numerals 422, 423, and 413 are repeatedly performed (two-dimensional iterative estimation). Consequently, the estimation accuracy of reference signal RS0 included in the signal represented by reference numeral 411a and reference signal RS1 included in the signal represented by reference numeral 421a can be gradually improved.

The first estimating unit 132 and the second estimating unit 133, for example, perform the operations represented by reference numerals 422, 423, and 413, a fixed number of times. Alternatively, the first estimating unit 132 and the second estimating unit 133 may perform the operations represented by reference numerals 422, 423, and 413 until the accuracy of channel estimation improves.

FIG. 5 is a block diagram of a configuration for implementing the channel estimation depicted in FIG. 4. A channel estimating apparatus 500 depicted in FIG. 5 is an example of a modification of the channel estimating apparatus 130 depicted in FIG. 1. The channel estimating apparatus 500 includes a receiver 510, estimating units 521, 522 to 52n, and estimating units 531, 532 to 53n, where (n=3, 4, 5, . . . ).

The receiver 510 receives the reference signal group transmitted from the base station 110 and the reference signal group transmitted from the base station 120. Reference signal 501 represents a reference signal that is in the reference signal group transmitted from the base station 110 and allocated a unique channel resource that is not allocated to a reference signal in the reference signal group transmitted from the base station 120.

Reference signal 502 is a reference signal that is in the reference signal group transmitted from the base station 120 and allocated a unique channel resource that is not allocated to a reference signal in the reference signal group transmitted from the base station 110. Signal 503 is a signal that includes reference signals of each reference signal group transmitted from the base station 110 and the base station 120, the reference signals being allocated the same channel resource.

The receiver 510 outputs each reference signal 501 and signal 503 to the estimating units 521, 522 to 52n, respectively. Further, the receiver 510 outputs each reference signal 502 and signal 503 to the estimating units 531, 532 to 53n, respectively.

The estimating unit 521 applies Weiner filtering to reference signal 501 and signal 503 output from the receiver 510, and estimates the reference signal output from the base station 110 and included in signal 503. The estimating unit 521 outputs the estimated reference signal to the estimating unit 531.

The estimating unit 531 subtracts from signal 503 output from the receiver 510, the reference signal output from the estimating unit 521 and estimates the reference signal output from the base station 120 and included in signal 503. Further, the estimating unit 531 applies Wiener filtering to each reference signal 502 output from the receiver 510 and to the estimated reference signal, and estimates the reference signal output from the base station 120. The estimating unit 531 outputs the estimated reference signal to the estimating unit 522.

The estimating unit 522 subtracts from signal 503 output from the receiver 510, the reference signal output from the estimating unit 531 and estimates the reference signal output from the base station 110 and included in signal 503. Further, the estimating unit 522 applies Weiner filtering to each reference signal 501 output from the receiver 510 and to the estimated reference signal, and estimates the reference signal output from the base station 110. The estimating unit 522 outputs the estimated reference signal to the estimating unit 532.

The estimating unit 532 subtracts from signal 503 output from the receiver 510, the reference signal output from the estimating unit 522 and estimates the reference signal output from the base station 120 and included in the signal 503. Further, the estimating unit 532 applies Wiener filtering to each reference signal 502 output from the receiver 510 and to the estimated reference signal, estimates the reference signal output from the base station 120, and outputs the estimated reference signal to the estimating unit 523 (not depicted).

The estimating unit 52n subtracts from signal 503 output from the receiver 510, the reference signal output from the estimating unit 53(n−1) (not depicted) and estimates the reference signal output from the base station 110 and included in signal 503. Further, the estimating unit 52n applies Weiner filtering to each reference signal 501 output from the receiver 510 and to the estimated reference signal, and estimates the reference signal output from the base station 110.

The estimating unit 52n outputs the estimated reference signal to the estimating unit 53n. Further, the estimating unit 52n outputs each Weiner filtered reference signal downstream. In this manner, subtraction and Weiner filtering using the reference signals output from the estimating units 531 to 53n are repeatedly performed by the estimating units 521 to 52n (the estimating unit 521 does not perform subtraction), whereby the reference signal output from the base station 110 is accurately estimated.

The estimating unit 53n subtracts from signal 503 output from the receiver 510, the reference signal output from the estimating unit 52n and estimates the reference signal output from the base station 120 and included in signal 503. Further, the estimating unit 53n applies Weiner filtering to each reference signal 502 output from the receiver 510 and to the estimated reference signal, and outputs each Weiner filtered reference signal downstream.

In this manner, subtraction and Weiner filtering using the reference signals output from the estimating units 521 to 52n are repeatedly performed by the estimating units 531 to 53n, whereby the reference signal output from the base station 120 is accurately estimated. The reference signals output from the base station 110 and estimated by estimating units 521 to 52n, and the reference signals output from the base station 120 and estimated by the estimating units 531 to 53n are, for example, used in channel resource allocation for a terminal apparatus equipped with the channel estimating apparatus 500.

FIG. 6 is a block diagram of a configuration of the estimating unit 521 depicted in FIG. 5. As depicted in FIG. 6, the estimating unit 521 (see FIG. 5) includes a canceller 610 and a Weiner filter 620. Among reference signals 501 and signal 503 input to the estimating unit 521, signal 503 is input to the canceller 610 and each reference signal 501 is input to the Weiner filter 620. An estimated reference signal is not input to the canceller 610 of the estimating unit 521 (0).

Therefore, the canceller 610 outputs signal 503 as is to the Weiner filter 620. The Weiner filter 620 filters each reference signal 501 input thereto and signal 503 output from the canceller 610. The Weiner filter 620 outputs to the estimating unit 531, reference signal 630 (output from the base station 110) estimated by Weiner filtering and included in signal 503.

FIG. 7 is a block diagram of a configuration of the estimating unit 531 depicted in FIG. 5. In FIG. 7, components identical to those depicted in FIG. 6 are given the same reference numerals used in FIG. 6 and description thereof is omitted. In the estimating unit 531, among reference signals 502 and signal 503 input thereto, signal 503 is input to the canceller 610 and each reference signal 502 is input to the Weiner filter 620.

Signal 503 and reference signal 630 output from the estimating unit 521 are input to the canceller 610. The canceller 610 cancels (subtracts) from signal 503 input thereto, reference signal 630 output from the estimating unit 521. The canceller 610 outputs to the Weiner filter 620, reference signal 710 obtained by the cancellation.

The Weiner filter 620 filters each reference signal 502 input thereto and reference signal 710 output from the canceller 610. The Weiner filter 620 outputs to the estimating unit 522, reference signal 720 (output from the base station 120) estimated by Weiner filtering and included in signal 503.

FIG. 8 is a block diagram of the estimating unit 522 depicted in FIG. 5. In FIG. 8, components identical to those depicted in FIG. 6 are given the same reference numerals used in FIG. 6 and description thereof is omitted. In the estimating unit 522, among the reference signals 501 and signal 503 input thereto, signal 503 is input to the canceller 610 and each reference signal 501 is input to the Weiner filter 620.

Signal 503 and reference signal 720 output from the estimating unit 531 are input to the canceller 610. The canceller 610 cancels (subtracts) from signal 503 input thereto, reference signal 720 output from the estimating unit 531. The canceller 610 outputs to the Weiner filter 620, reference signal 810 obtained by the cancellation.

The Weiner filter 620 filters each reference signal 501 input thereto and reference signal 810 output from the canceller 610. The Weiner filter 620 outputs to the estimating unit 532, reference signal 820 (output from the base station 110) estimated by Weiner filtering and included in signal 503.

The estimating unit 532 depicted in FIG. 5 is identical to the estimating unit 531 depicted in FIG. 7 and therefore, description thereof is omitted. However, signal 503 and reference signal 820 output from the estimating unit 522 are input to the canceller 610 of the estimating unit 532. The canceller 610 cancels from signal 503 input thereto, reference signal 820 output from the estimating unit 522. The Weiner filter 620 outputs to the estimating unit 523, the reference signal (output from the base station 120) estimated by Weiner filtering and included in signal 503.

FIG. 9 is a block diagram of a configuration of the estimating unit 52n depicted in FIG. 5. In FIG. 9, components identical to those depicted in FIG. 6 are given the same reference numerals used in FIG. 6 and description thereof is omitted. In the estimating unit 52n, among reference signals 501 and signal 503 input thereto, signal 503 is input to the canceller 610 and each reference signal 501 is input to the Weiner filter 620.

Signal 503 and reference signal 910 output from the estimating unit 53(n-1) are input to the canceller 610. The canceller 610 cancels from signal 503 input thereto, reference signal 910. The canceller 610 outputs to the Weiner filter 620, reference signal 920 obtained by the cancellation.

The Weiner filter 620 filters each reference signal 501 input thereto and reference signal 920 output from the canceller 610. The Weiner filter 620 outputs to the estimating unit 53n, reference signal 930 (output from the base station 110) estimated by Weiner filtering and included in signal 503. Further, the Weiner filter 620 outputs downstream a Weiner-filtered reference signal group 940.

Figure 10:
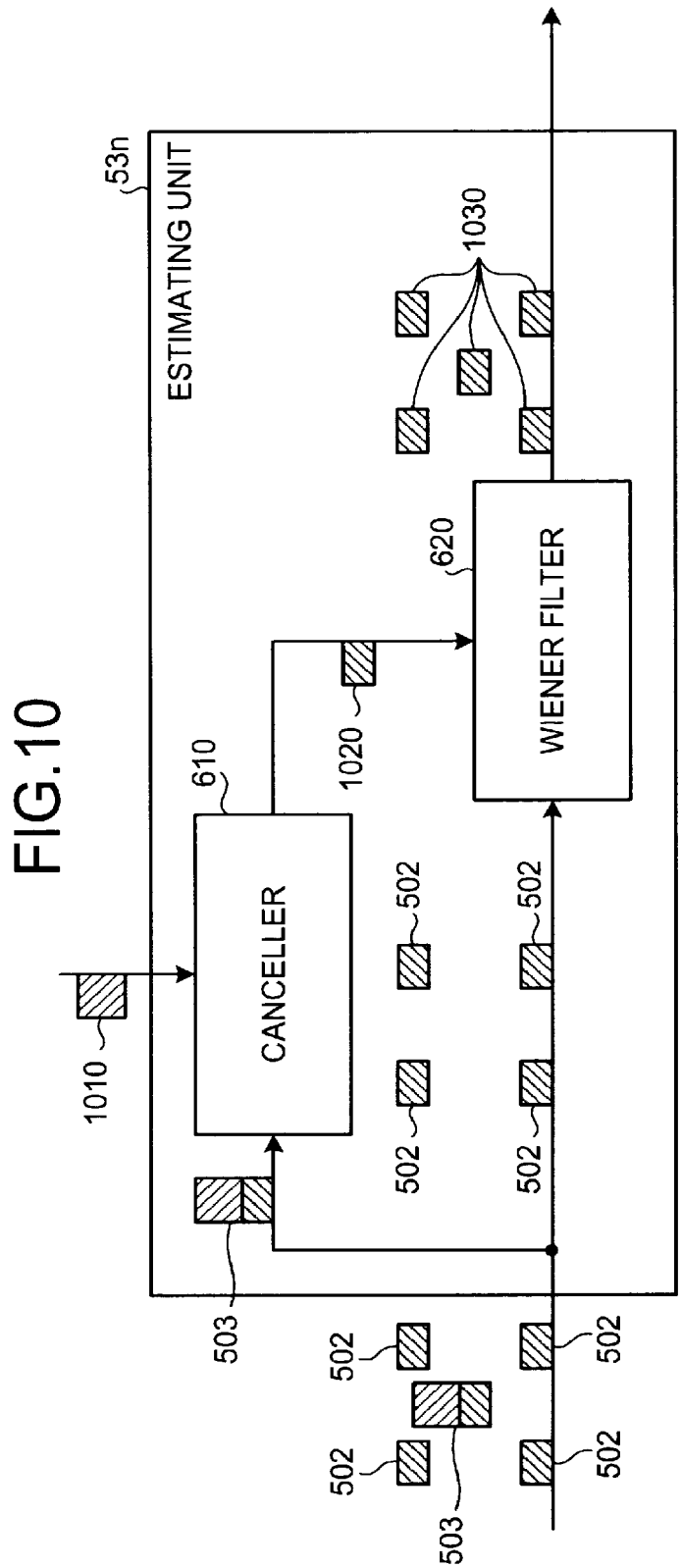
FIG. 10 is a block diagram of a configuration of an estimating unit 53n depicted in FIG. 5.

FIG. 10 is a block diagram of a configuration of the estimating unit 53n depicted in FIG. 5. In FIG. 10, components identical to those depicted in FIG. 6 are given the same reference numerals used in FIG. 6 and description thereof is omitted. In the estimating unit 53n, among reference signals 502 and signal 503 input thereto, signal 503 is input to the canceller 610 and each reference signal 502 is input to the Weiner filter 620.

Signal 503 and reference signal 1010 output from the estimating unit 52n are input to the canceller 610. The canceller 610 cancels from signal 503 input thereto, reference signal 1010. The canceller 610 outputs to the Weiner filter 620, reference signal 1020 obtained by the cancellation.

The Weiner filter 620 filters each reference signal 502 input thereto and reference signal 1020 output from the canceller 610. The Weiner filter 620 outputs downstream, a reference signal group 1030 estimated by Weiner filtering.

FIG. 11 is a flowchart depicting an operation example of the channel estimating apparatus depicted in FIG. 5. The channel estimating apparatus determines, at the receiver 510, whether the strength of reference signal RS0 (e.g., reference signal 501) received from the base station 110 is greater than the strength of reference signal RS1 (e.g., reference signal 502) received from the base station 120 (step S1101).

At step S1101, if the strength of reference signal RS0 is greater than that of reference signal RS1 (step S1101: YES), the receiver 510 outputs reference signal RS0 to the estimating unit 521 and outputs reference signal RS1 to the estimating unit 531. Next, the estimating unit 521 estimates reference signal RS0 (step S1102). The estimating unit 531 estimates reference signal RS1 (step S1103).

Next, the channel estimating apparatus determines whether the reference signal estimations at steps S1102 and S1103 have been performed n-times (step S1104). If the reference signal estimations have not been performed n-times (step S1104: NO), the channel estimating apparatus returns to step S1102 and continues processing therefrom. If the reference signal estimations have been performed n-times (step S1104: YES), a series of the operations ends.

At step S1101, if the strength of reference signal RS0 is not greater than that of reference signal RS1 (step S1101: NO), the receiver 510 outputs reference signal RS1 to the estimating unit 521 and outputs reference signal RS0 to the estimating unit 531. The estimating unit 521 estimates reference signal RS1 (step S1105) and then, the estimating unit 531 estimates reference signal RS0 (step S1106).

Next, the channel estimating apparatus determines whether the reference signal estimations at steps S1105 and S1106 have been performed n-times (step S1107). If the reference signal estimations have not been performed n-times (step S1107: NO), the channel estimating apparatus returns to step S1105 and continues processing therefrom. If the reference signal estimations have been performed n-times (step S1107: YES), a series of the operations ends.

By the steps above, among reference signal RS0 and reference signal RS1, the reference signal having the higher strength can be estimated first. Further, as depicted in FIG. 5, for n-times, reference signal RS0 is subject to subtraction and Weiner filtering using reference signal RS1. Further, for n-times, reference signal RS1 is subject to subtraction and Weiner filtering using reference signal RS0. Consequently, reference signal RS0 and reference signal RS1 are accurately estimated.

Here, although operation in which reference signal RS0 and reference signal RS1 are estimated n-times has been described, at steps S1104 and S1107, it may be determined whether estimation accuracy has improved. Consequently, reference signal RS0 and reference signal RS1 can be repeatedly estimated until the estimation accuracy improves.

Figure 12A:
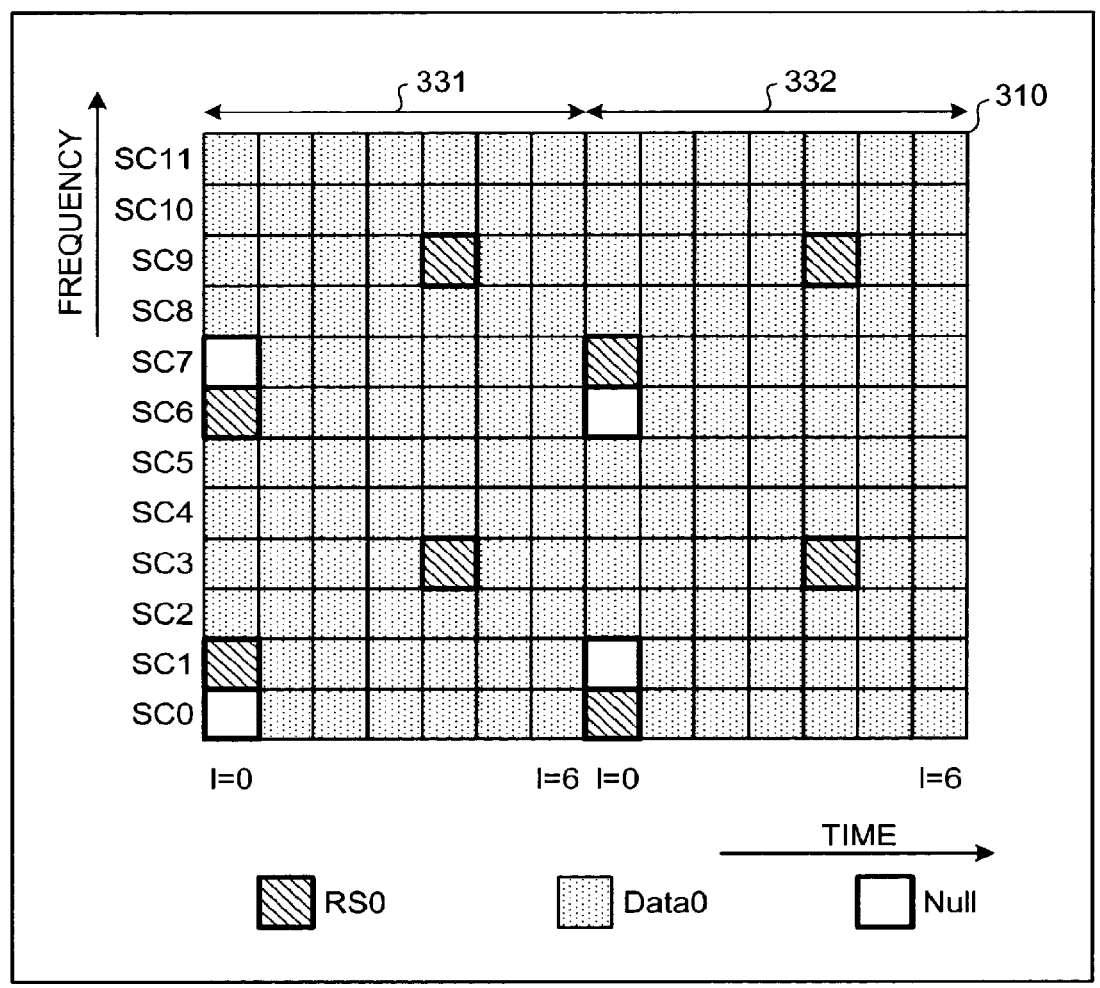
FIG. 12A is a diagram depicting another example of reference signal design (part 1).
Figure 12B:
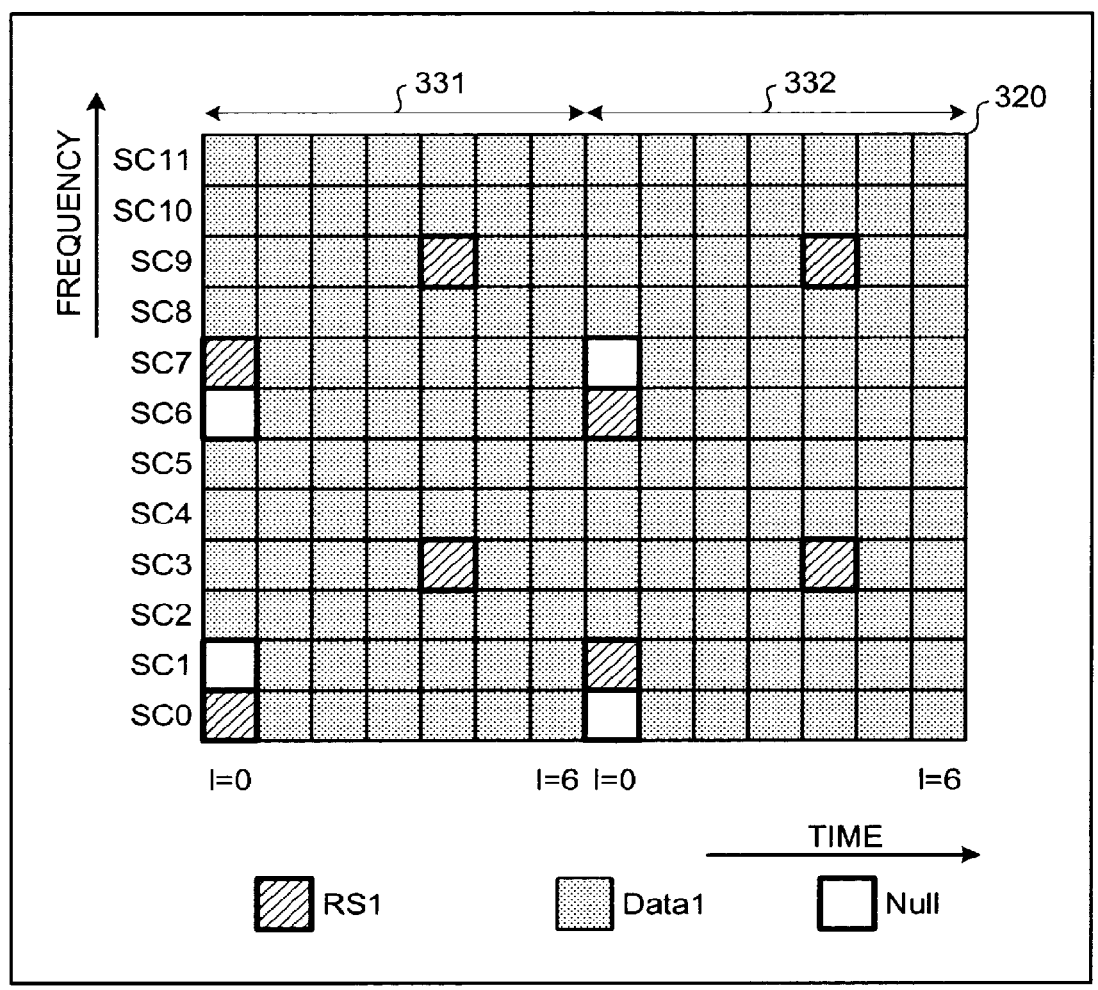
FIG. 12B is a diagram depicting another example of reference signal design (part 2).

FIG. 12A is a diagram depicting another example of reference signal design (part 1). FIG. 12B is a diagram depicting another example of reference signal design (part 2). In FIGS. 12A and 12B, descriptions of portions identical to those depicted in FIGS. 3A and 3B will be omitted. In the present design example, in signal 310 and signal 320, reference signals that are in the reference signal groups and respectively allocated unique channel resources, are alternately allocated orthogonal subcarriers.

For example, in the sub-frame 331 of the signal 310, reference signal RS0 is allocated slot l=0 of subcarrier SC1, slot l=4 of subcarrier SC3 and subcarrier SC9, and slot l=0 of subcarrier SC6. Further, the sub-frame 331 of signal 310, a null signal is allocated slot l=0 of subcarrier SC0 and slot l=0 of subcarrier SC7.

In the sub-frame 332 of signal 310, reference signal RS0 is allocated slot l=0 of subcarrier SC0, slot l=4 of subcarrier SC3 and subcarrier SC9, and slot l=0 of subcarrier SC7. Further, in the sub-frame 332 of signal 310, a null signal is allocated slot l=0 of subcarrier SC1 and slot l=0 of subcarrier SC6.

In this manner, in signal 310, reference signal RS0 is allocated subcarrier SC1 in the sub-frame 331; and in the sub-frame 332, reference signal RS0 is allocated subcarrier SC0, which is orthogonal to subcarrier SC1. Further, in the sub-frame 331, reference signal RS0 is allocated subcarrier SC6; and in the sub-frame 332, reference signal RS0 is allocated subcarrier SC7, which is orthogonal to subcarrier SC6.

In the sub-frame 331 of signal 320, reference signal RS1 is allocated slot l=0 of subcarrier SC0, slot l=4 of subcarrier SC3 and subcarrier SC9, and slot l=0 of subcarrier SC7. Further, in the sub-frame 331 of signal 320, a null signal is allocated slot l=0 of subcarrier SC1 and slot l=0 of subcarrier SC6.

In the sub-frame 332 of signal 320, reference signal RS1 is allocated slot l=0 of subcarrier SC1, slot l=4 of subcarrier SC3 and subcarrier SC9, and slot l=0 of subcarrier SC6. Further, in the sub-frame 332 of signal 320, a null signal is allocated slot l=0 of subcarrier SC0 and slot l=0 of subcarrier SC7.

In this manner, in signal 320, reference signal RS1 is allocated subcarrier SC0 in the sub-frame 331; and in the sub-frame 332, reference signal RS1 is allocated subcarrier SC1, which is orthogonal to subcarrier SC0. Further, in the sub-frame 331, reference signal RS1 is allocated subcarrier SC7; and in the sub-frame 332, reference signal RS1 is allocated subcarrier SC6, which is orthogonal to subcarrier SC7.

Respectively, in signal 310 and signal 320, reference signals that are allocated a unique channel resource, are alternately allocated orthogonal subcarriers, whereby reference signal allocation according to frequency can be distributed, enabling the accuracy of channel estimation at each frequency to be improved.

Figure 13A:
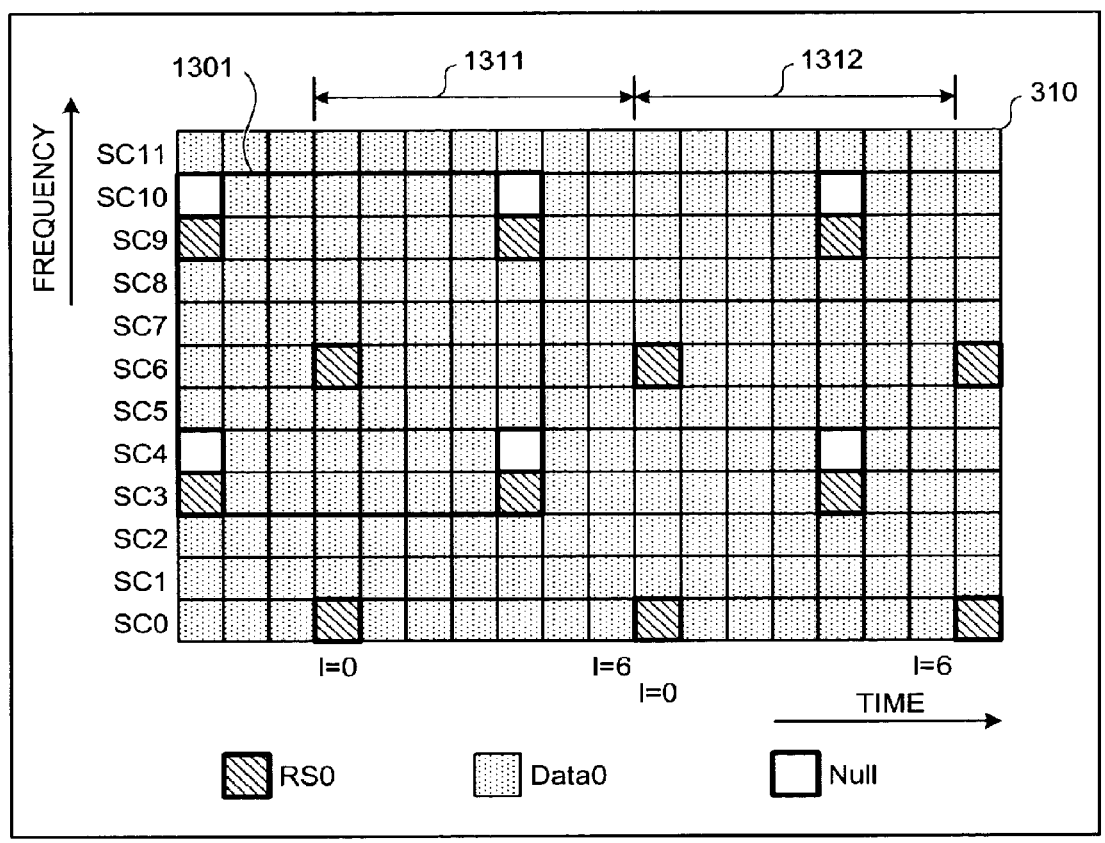
FIG. 13A is a diagram depicting yet another example of reference signal design (part 1).
Figure 13B:
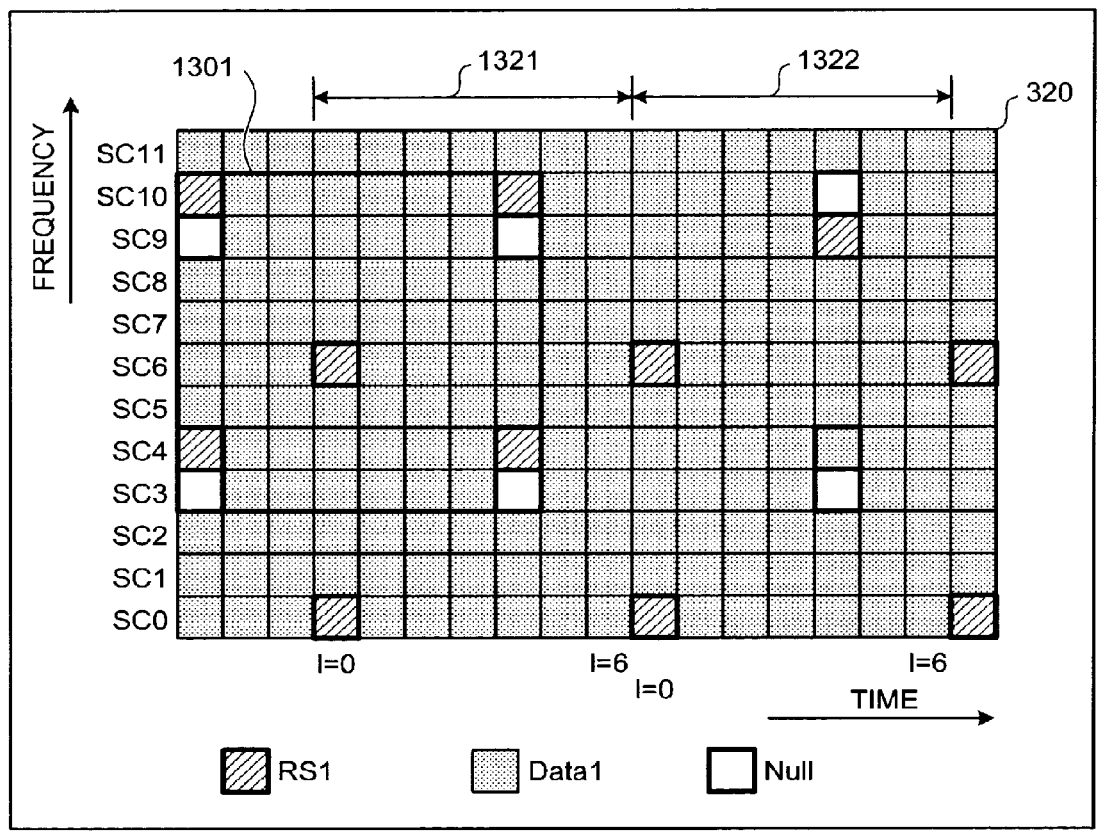
FIG. 13B is a diagram depicting yet another example of reference signal design (part 2).

FIG. 13A is a diagram depicting yet another example of reference signal design (part 1). FIG. 13B is a diagram depicting yet another example of reference signal design (part 2). In FIGS. 13A and 13B, descriptions of portions identical to those in FIGS. 3A and 3B will be omitted. In the present design example, among the reference signal groups in signal 310 and signal 320, reference signals allocated the same channel resource, are allocated the head slot of a sub-frame.

In the sub-frame 1311 and the sub-frame 1312 of signal 310, reference signal RS0 is allocated slot l=0 of subcarrier SC0 and subcarrier SC6, and slot l=4 of subcarrier SC4 and subcarrier SC9. Further, a null signal is allocated slot l=4 of subcarrier SC4 and subcarrier SC10.

In the sub-frame 1321 and the sub-frame 1322 of signal 320, reference signal RS0 is allocated slot l=0 of subcarrier SC0 and subcarrier SC6, and slot l=4 of subcarrier SC4 and subcarrier SC10. Further, a null signal is allocated slot l=4 of subcarrier SC3 and subcarrier SC9.

In this manner, in the reference signal groups of signal 310 and signal 320, reference signals allocated the same channel resource are allocated to the head of a sub-frame (slot l=0), whereby, for example, channel estimation by the first estimating unit 132 can be started at the time when the head of the sub-frame is received. Consequently, channel estimation can be performed quickly. A range 1301 in FIGS. 13A and 13B represents a unit of the reference signal group subject to Weiner filtering.

Figure 14:
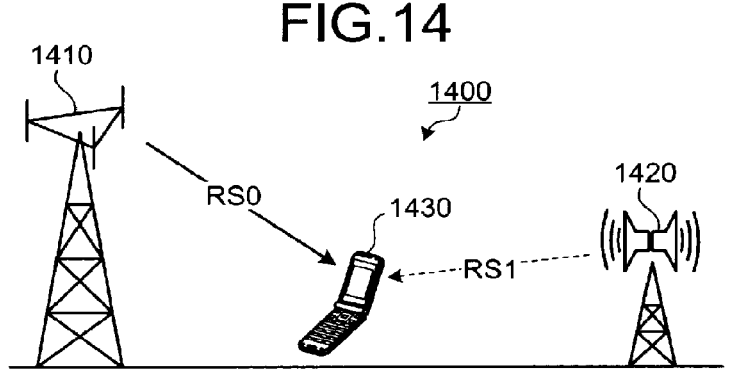
FIG. 14 is a diagram depicting a first application example of the communication system.

FIG. 14 is a diagram depicting a first application example of the communication system. The communication system 100 depicted in FIG. 1 can be applied to a communication system 1400 depicted in FIG. 14. The communication system 1400 includes a base station 1410, a base station 1420, and a terminal apparatus 1430 (user equipment (UE)). The base station 1410 and the base station 1420 both provide a wireless service to the terminal apparatus 1430.

The base station 1410 includes a wireless communications unit that transmits to the terminal apparatus 1430, a first reference signal group that includes multiple reference signals RS0. The base station 1420 includes a wireless communications unit that transmits to the terminal apparatus 1430, a second reference signal group that includes multiple reference signals RS1. A portion of the reference signal channel resources for the first reference signal group and for the second reference signal group are the same.

The terminal apparatus 1430 includes the channel estimating apparatus 130 depicted in FIG. 1 or the channel estimating apparatus 500 depicted in FIG. 5. The terminal apparatus 1430 accurately estimates the received first reference signal group and second reference signal group. The terminal apparatus 1430, for example, based on the resulting estimation, selects a communication counterpart from among the base station 1410 and the base station 1420.

Figure 15:
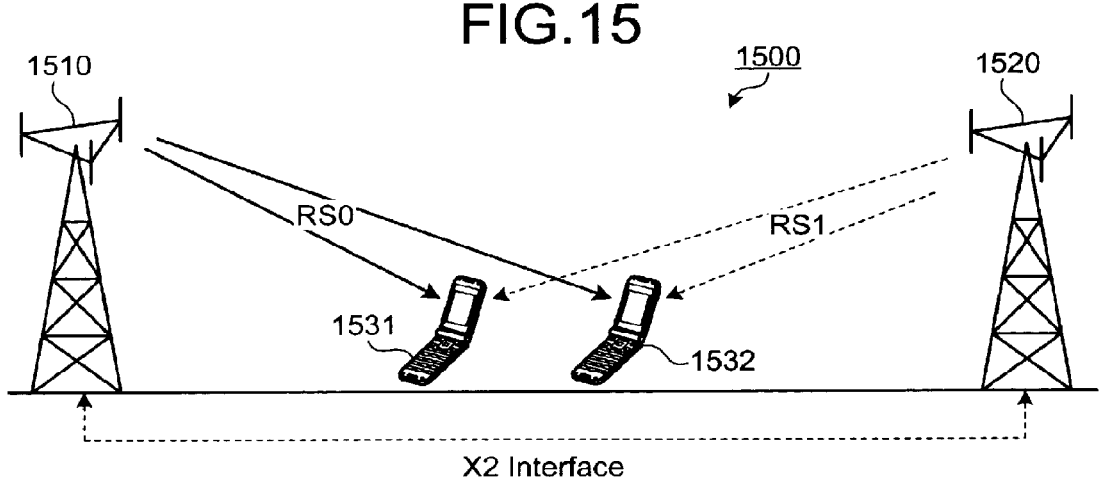
FIG. 15 is a diagram depicting a second application example of the communication system.

FIG. 15 is a diagram depicting a second application example of the communication system. The communication system 100 depicted in FIG. 1, for example, can be applied to a communication system 1500 depicted in FIG. 15. The communication system 1500 is a coordinated multi-point (COMP) system. For example, the communication system 1500 includes a base station 1510, a base station 1520, a terminal apparatus 1531, and a terminal apparatus 1532.

In the communication system 1500, the base station 1510 is a Serving eNode-B and the base station 1520 is a Collaborative eNode-B. The terminal apparatus 1531 and the terminal apparatus 1532 can receive both reference signal RS0 transmitted from the base station 1510 and reference signal RS1 transmitted from the base station 1520.

The terminal apparatuses 1531, 1532, respectively, include the channel estimating apparatus 130 depicted in FIG. 1 or the channel estimating apparatus 500 depicted in FIG. 5. The terminal apparatuses 1531, 1532, respectively, accurately estimate the received first reference signal group and second reference signal group. The terminal apparatuses 1531, 1532, respectively for example, based on the resulting estimation, select a communication counterpart from among the base station 1510 and the base station 1520.

Figure 16:
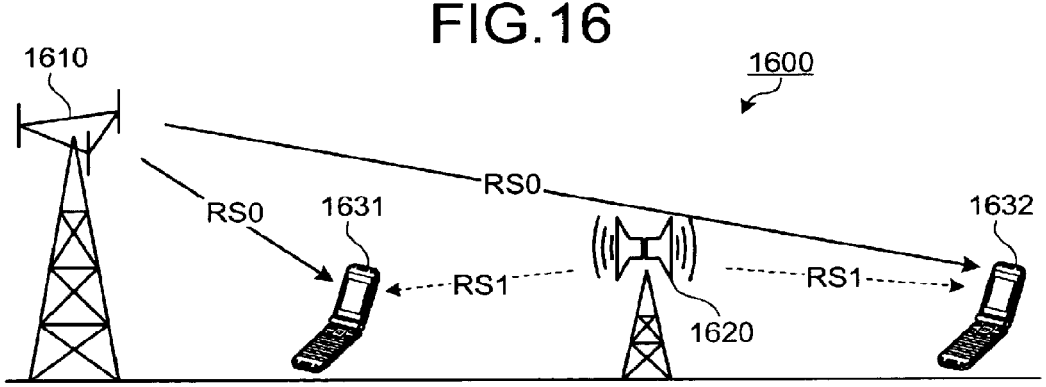
FIG. 16 is a diagram depicting a third application of the communication system.

FIG. 16 is a diagram depicting a third application of the communication system. The communication system 100 depicted in FIG. 1, for example, can be applied to a communication system 1600 depicted in FIG. 16. The communication system 1600 is a relay forwarding system that includes a base station 1610, a relay station 1620, a terminal apparatus 1631, and a terminal apparatus 1632.

The terminal apparatus 1632 can select from among a direct, wireless communication path with the base station 1610 and a wireless communication path with the base station 1610, passing through the relay station 1620 and the terminal apparatus 1631. The terminal apparatus 1632 can receive both reference signal RS0 transmitted from the base station 1610 and reference signal RS1 transmitted from the relay station 1620.

The terminal apparatus 1632 includes the channel estimating apparatus 130 depicted in FIG. 1 or the channel estimating apparatus 500 depicted in FIG. 5. The terminal apparatus 1632 accurately estimates the received first reference signal group and second reference signal group. The terminal apparatus 1632, for example, based on the resulting estimation, selects at least one among, the direct communication path with the base station 1610 and the communication passing through the relay station 1620 and the terminal apparatus 1631.

Figure 17:
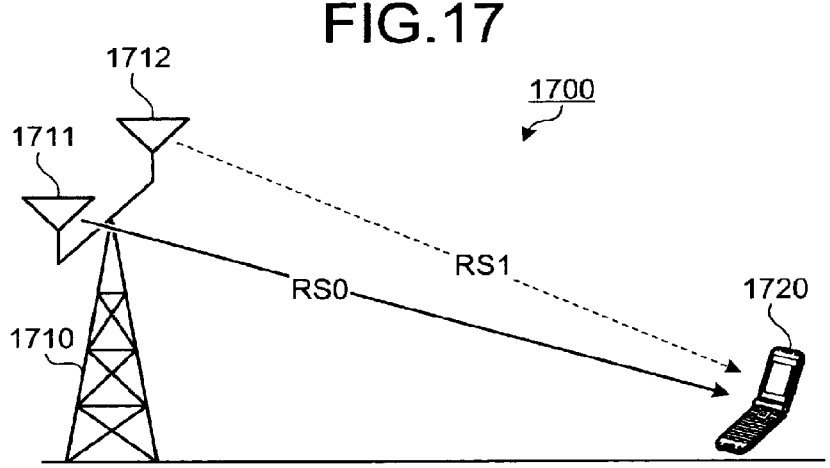
FIG. 17 depicts a fourth application example of the communication system.

FIG. 17 depicts a fourth application example of the communication system. The communication system 100 depicted in FIG. 1 can be applied to a communication system 1700 depicted in FIG. 17. The communication system 1700 is a multiple input multiple output (MIMO) system that includes a base station 1710 and a terminal apparatus 1720. The base station 1710 includes a first wireless communications unit 1711 and a second wireless communications unit 1712.

The base station 1710 can communicate with the terminal apparatus 1720 via both the first wireless communications unit 1711 and the second wireless communications unit 1712. The first wireless communications unit 1711 transmits to the terminal apparatus 1720, the first reference signal group that includes reference signal RS0. The second wireless communications unit 1712 transmits to the terminal apparatus 1720, the second reference signal group that includes reference signal RS1.

A portion of the reference signal channel resources for the second reference signal group transmitted by the second wireless communications unit 1712 and a portion of the reference signal channel resources for the first reference signal group transmitted by the first wireless communications unit 1711 are the same. In this case, the first wireless communications unit 1711 has a configuration that corresponds to the base station 110 depicted in FIG. 1; and the second wireless communications unit 1712 has a configuration that corresponds to the base station 120 depicted in FIG. 1.

The terminal apparatus 1720 can receive both reference signal RS0 output from the first wireless communications unit 1711 and reference signal RS1 output from the second wireless communications unit 1712. The terminal apparatus 1720 includes the channel estimating apparatus 130 depicted in FIG. 1 or the channel estimating apparatus 500 depicted in FIG. 5. The terminal apparatus 1720 accurately estimates the received first reference signal group and second reference signal group. The terminal apparatus 1720, for example, based on the resulting estimation, selects a communication counterpart from among the first wireless communications unit 1711 and the second wireless communications unit 1712.

In FIGS. 3A and 3B, an example was described in which 4 reference signals respectively using unique channel resources surround reference signals in signal 310 and in signal 320 that use the same channel resource. However, the arrangement of the reference signals using unique channel resources is not limited hereto. Next, other examples of reference signal arrangement will be described.

Figure 18A:
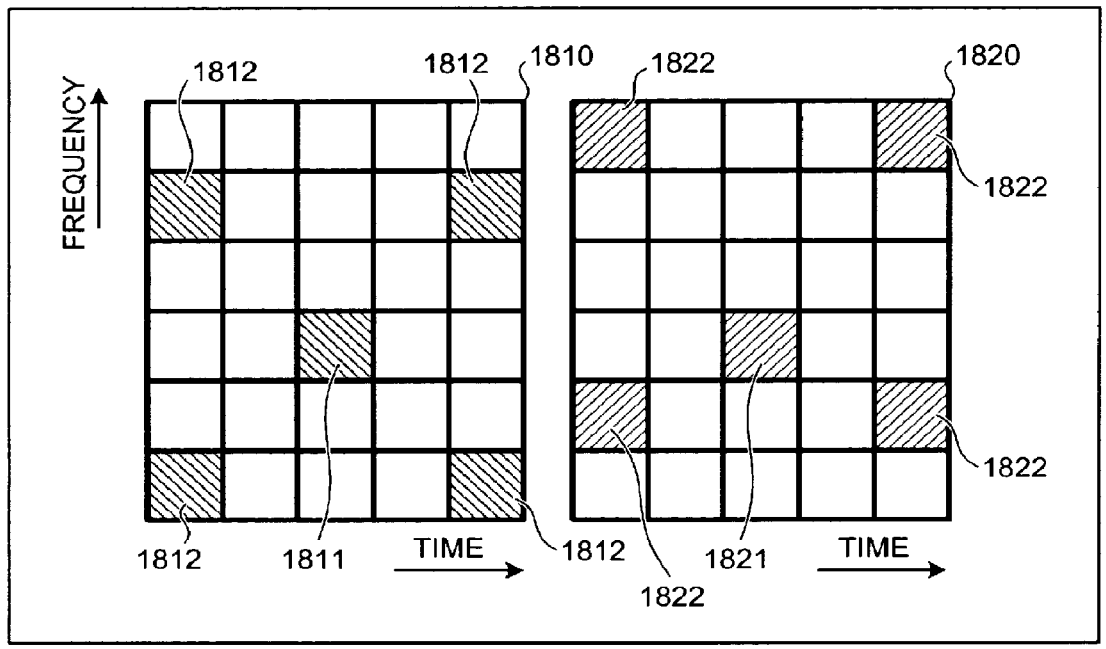
FIG. 18A is a diagram depicting a first example of reference signal design modification.

FIG. 18A is a diagram depicting a first example of reference signal design modification. In FIGS. 18A to 18F, signal 1810 represents a signal transmitted from the base station 110. Signal 1820 represents a signal transmitted from the base station 120. Further, similar to the example in FIGS. 3A and 3B, signal 1810 and signal 1820 are respectively allocated channel resources that are divided by a horizontal axis and vertical axis grids.

Reference signal 1811 represents a reference signal that is in the reference signal group included in signal 1810 and allocated a common channel resource also allocated to a reference signal in the reference signal group included in signal 1820. Reference signal 1812 represents a reference signal that is in the reference signal group included in signal 1810 and allocated a unique channel resource that is not allocated to a reference signal in the reference signal group included in signal 1820.

Reference signal 1821 represents a reference signal that is in the reference signal group included in signal 1820 and allocated a common channel resource that is also allocated to a reference signal in the reference signal group included in signal 1810. Reference signal 1822 represents a reference signal that is in reference signal group included in signal 1820 and allocated a unique channel resource that is not allocated to a reference signal in the reference signal group included in signal 1810.

The example depicted in FIG. 18A, similar to the example depicted in FIGS. 3A and 3B, in signal 1810, reference signal 1811 is surrounded by 4 reference signals 1812. In this case, in signal 1820 as well, reference signal 1821 is surrounded by 4 reference signals 1822. According to the present example, in the Weiner filtering of reference signal 1811 and of each reference signal 1812, reference signal 1811 is accurately estimated based on reference signal 1812.

Further, in the Weiner filtering of reference signal 1821 and of each reference signal 1822, reference signal 1821 is accurately estimated based on reference signal 1822. Consequently, even if the number of times (for example, n in FIG. 5 or FIG. 11) that the estimation operation is performed is reduced, channel estimation can be accurately performed, enabling improved channel estimating speed.

Further, since reference signal 1811 and reference signal 1821 are allocated the same channel resource, in signal 1810 and signal 1820, the number of channel resources used for allocation to reference signals can be reduced. For example, compared to a case where each reference signal is allocated a unique channel resource, the number of channel resources used for allocation to the reference signals can be cut by ¼.

Figure 18B:
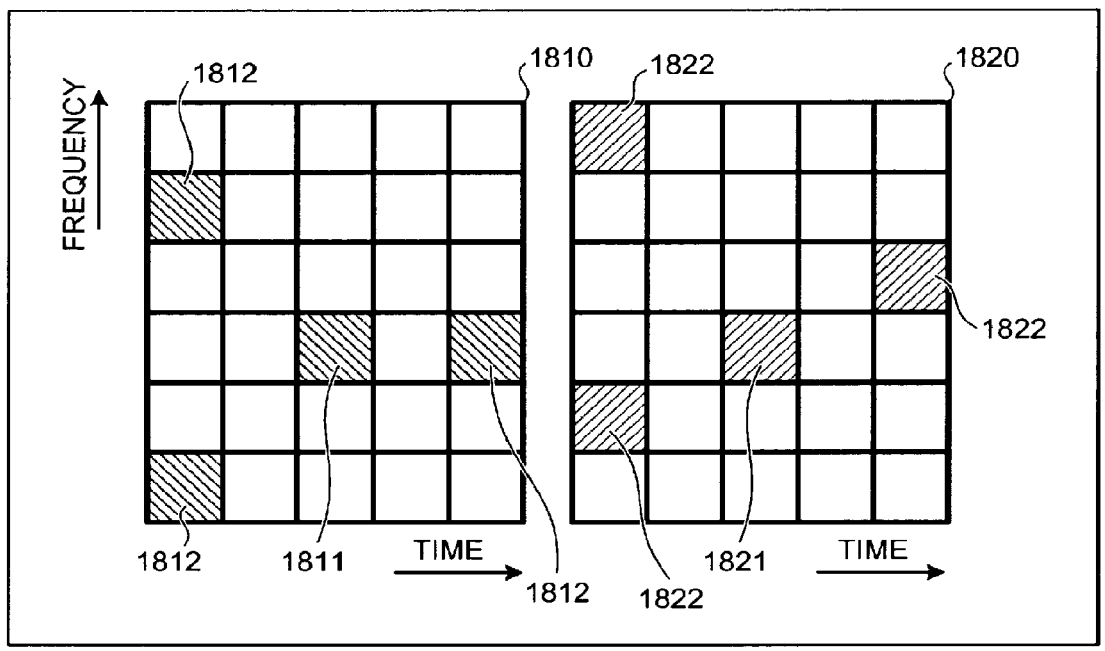
FIG. 18B is a diagram depicting a second example of reference signal design modification.
Figure 18C:
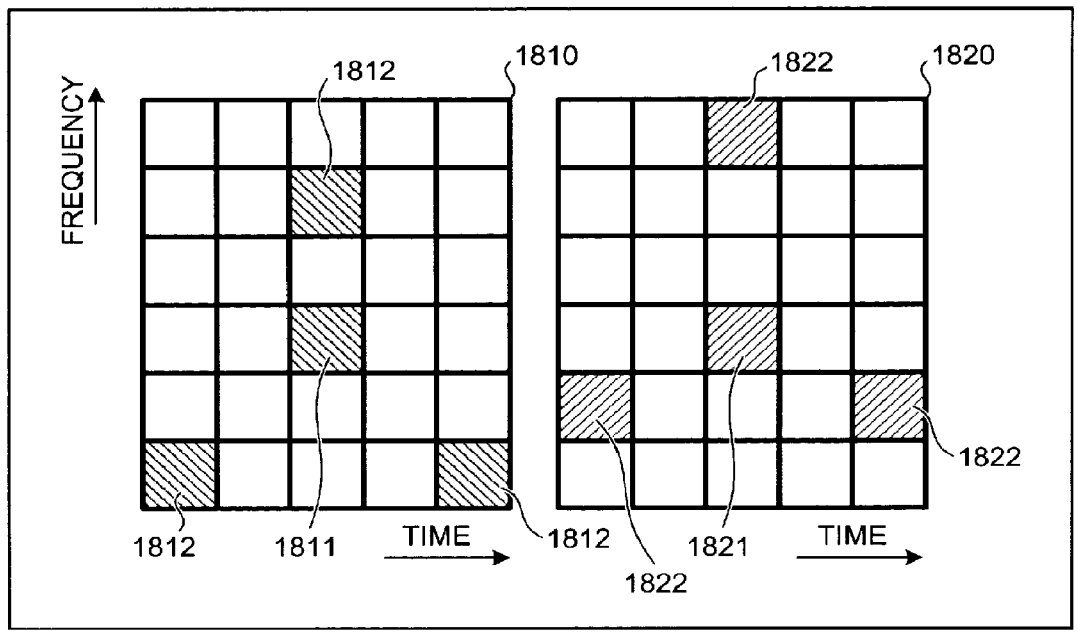
FIG. 18C is a diagram depicting a third example of reference signal design modification.

FIG. 18B is a diagram depicting a second example of reference signal design modification. FIG. 18C is a diagram depicting a third example of reference signal design modification. In the example depicted in FIGS. 18B and 18C, in signal 1810, reference signal 1811 is surrounded by 3 reference signals 1812. In this case, in signal 1820, reference signal 1821 is surrounded by 3 reference signals 1822. In this example as well, the accuracy of reference signal estimation at Weiner filtering is improved.

Further, the number of channel resources used for allocation to reference signals can be reduced. For example, compared to a case where each reference signal is allocated a unique channel resource, the number of channel resources used for allocation to the reference signals can be reduced by ⅓.

Figure 18D:
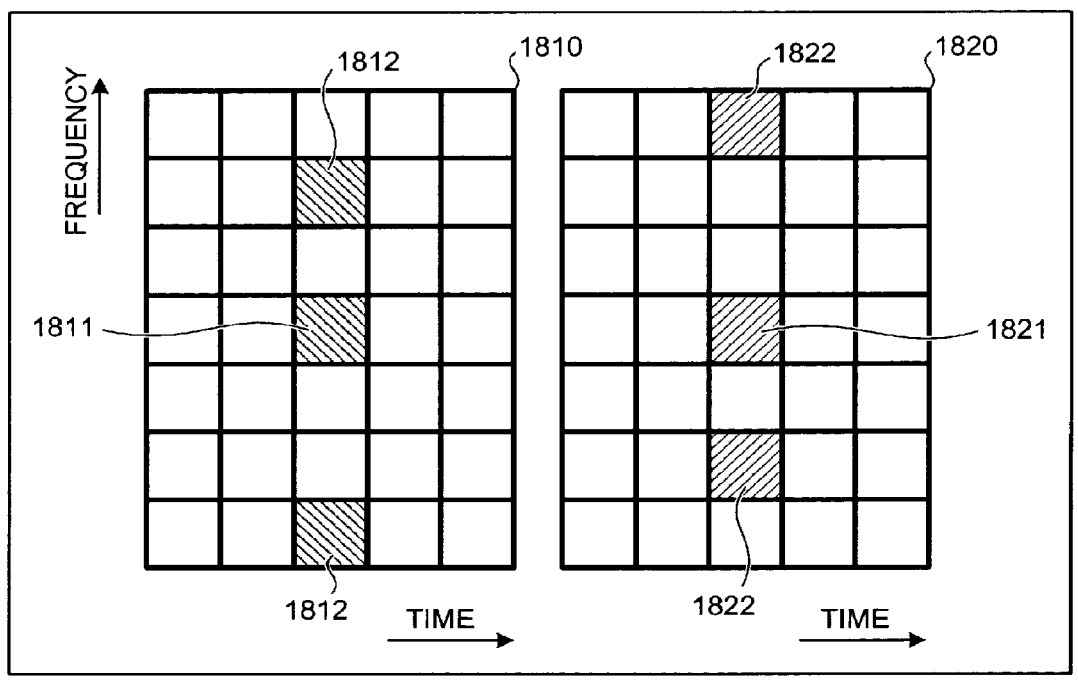
FIG. 18D is a diagram depicting a fourth example of reference signal design modification.
Figure 18E:
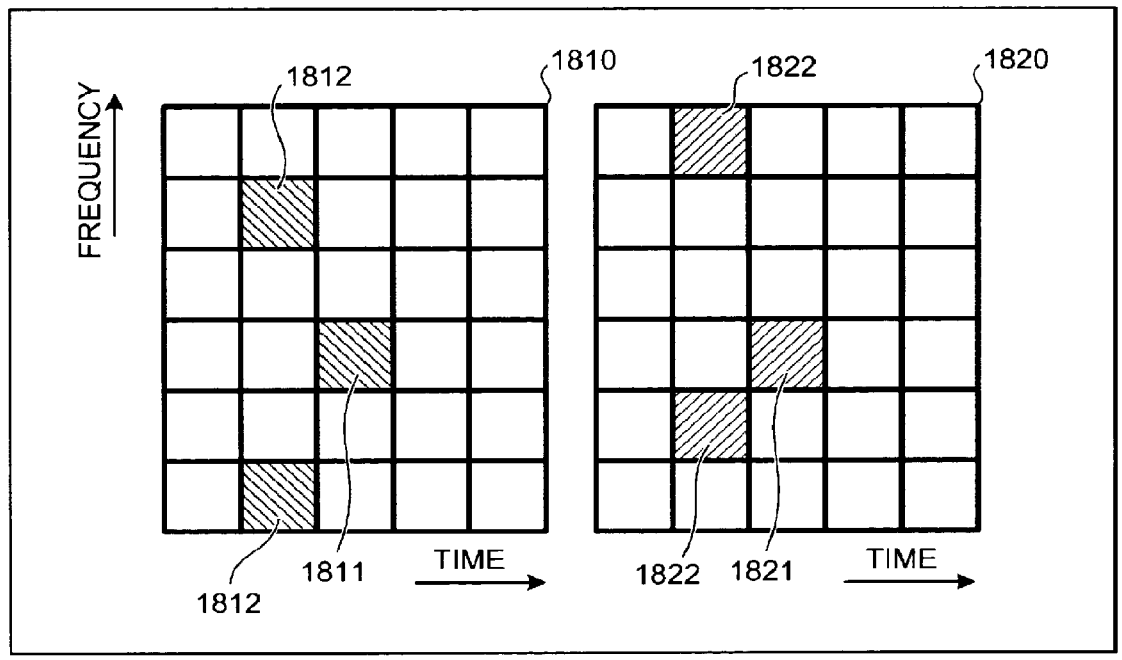
FIG. 18E is a diagram depicting a fifth example of reference signal design modification.
Figure 18F:
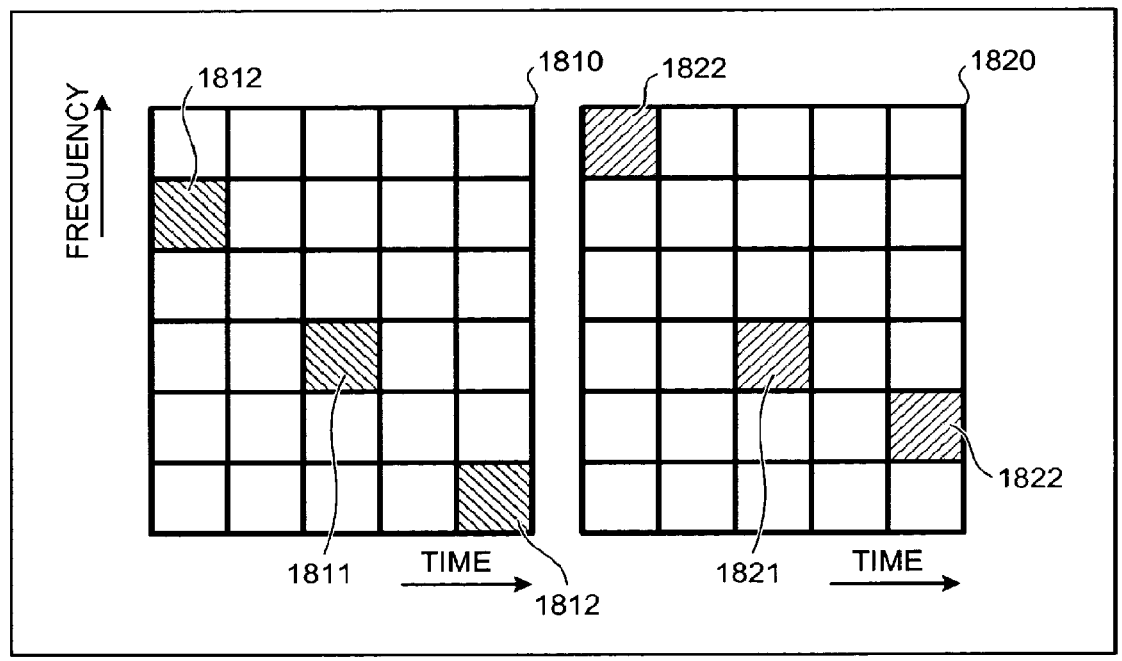
FIG. 18F is a diagram depicting a sixth example of reference signal design modification.

FIG. 18D is a diagram depicting a fourth example of reference signal design modification. FIG. 18E is a diagram depicting a fifth example of reference signal design modification. FIG. 18F is a diagram depicting a sixth example of reference signal design modification. In the examples depicted in FIGS. 18D to 18F, in signal 1810, 1 reference signal 1811 is surrounded by 2 reference signals 1812. In this case, in signal 1820, 1 reference signal 1821 is surrounded by 2 reference signals 1822. In these examples as well, the accuracy of reference signal estimation at Weiner filtering is improved.

Further, the number of channel resources used for allocation to reference signals can be reduced. For example, compared to a case each reference signal is allocated a unique channel resource, the number of channel resources used for allocation to the reference signals can be reduced by ½.

As described, according to the present invention, improved channel estimation accuracy and improved efficiency of channel resource utilization can be facilitated by providing a method of accurately estimating each reference signal group having a portion of mutually common channel resources.

As a method of accurately estimating each reference signal group having a portion of mutually common channel resources, first, reference signals that are allocated unique channel resources are used to estimate a reference signal that is allocated a channel resource also allocated to another reference signal. Next, the estimated reference signal is used to estimate the other reference signal allocated the same channel resource. As a result, even reference signals that use the same channel resource can be accurately estimated.

Further, a reference signal that is allocated a common channel resource and is in the reference signal group having the higher strength among the reference signal groups is estimated first. Thus, when the reference signal is estimated based on a reference signal that is allocated a unique channel resource, since the strength of the reference signal that that is allocated a unique channel resource is high, the accuracy of estimation can be further improved.

As a method of using a reference signal that is allocated a unique channel resource to estimate a reference signal that is allocated a common channel resource, a method of using Weiner filtering was described. However, the method is not limited hereto. For example, by performing processing that equalizes the reference signal allocated a unique channel resource and the reference signal allocated a common channel resource, the latter reference signal can be estimated.

Further, by using an estimated reference signal in another reference signal group to estimate a reference signal that is allocated a common channel resource and using a reference signal that is allocated a unique channel resource to estimate a reference signal allocated a common channel resource, repeatedly, the accuracy of channel estimation for each reference signal group can be further improved.

According to the present invention, improved channel resource utilization and channel estimation with substantially no deterioration in accuracy are effected.

An example of hardware configuration of the wireless base station in the embodiments above will be described. The respective functions of the wireless base station are implemented by a portion of or all of the hardware components below. The wireless base station includes a wireless interface (IF), a processor, memory, a logical circuit, a wired IF, etc. The wireless IF is an interface apparatus for wirelessly communicating with a wireless terminal. The processor is an apparatus that processes data and for example, includes a central processing unit (CPU), a digital signal processor (DSP), etc. The memory is a device that stores data and for example, includes read-only memory (ROM), random access memory (RAM), etc. The logical circuit is an electronic circuit that performs logical operations and for example, includes a large-scale integrated (LSI) circuit, a field-programming gate array (FPGA), an application specific integrated circuit (ASIC), etc. The wired IF is an interface apparatus for performing wired communication with other wireless base stations connected to a network (i.e., a backhaul network) on the mobile-telephone system side.

An example of hardware configuration of the relay station in the embodiments above will be described. The respective functions of the relay station are implemented by a portion of or all of the hardware components below. The relay station includes a wireless IF, a processor, memory, and a logical circuit. The wireless IF is an interface apparatus for wirelessly communicating with a wireless base station. The processor is an apparatus that processes data and for example, includes a CPU, a DSP, etc. The memory is a device that stores data and for example, includes ROM, RAM, etc. The logical circuit is an electronic circuit that performs logical operations and for example, includes an LSI circuit, an FPGA, an ASIC, etc.

An example of hardware configuration of the wireless terminal in the embodiments above will be described. The respective functions of the wireless terminal are implemented by a portion of or all of the hardware components below. The wireless terminal includes a wireless IF, a processor, memory, a logical circuit, an input IF, an output IF, etc. The wireless IF is an interface apparatus for wirelessly communicating with a wireless base station. The processor is an apparatus that processes data and for example, includes a CPU, a DSP, etc. The memory is a device that stores data and for example, includes ROM, RAM, etc. The logical circuit is an electronic circuit that performs logical operations and for example, includes an LSI circuit, an FPGA, an ASIC, etc. The input IF is a device that performs input, such as an operation button, a microphone, etc. The output IF is a device that performs output, such as a display, a speaker, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A channel estimating apparatus comprising:
   a wireless communication interface; and
   a processor configured for
      controlling the wireless communication interface to receive reference signal groups that are respectively transmitted from wireless communications units and that each include a reference signal that is allocated a common channel resource allocated to a reference signal in another reference signal group among the reference signal groups;
      in accordance with a first reference signal that is in a first reference signal group among the reference signal groups received by the wireless communication interface and that is allocated a unique channel resource not allocated to a second reference signal in another reference signal group, first estimating a third reference signal that is in the first reference signal group and allocated the common channel resource by applying Wiener filtering to the first reference signal group; and
      in accordance with the third reference signal estimated by the first estimating, second estimating a fourth reference signal that is in a second reference signal group among the received reference signal groups and that is allocated the common channel resource by subtracting the third reference signal from the second reference signal group.

2. The channel estimating apparatus according to claim 1, wherein
   the first reference signal group has a relatively high strength among the received reference signal groups, and
   the second reference signal group has a relatively low strength among the received reference signal groups.

3. The channel estimating apparatus according to claim 1, wherein
   the second estimating by the processor further includes estimating in accordance with a reference signal that is in the second reference signal group and allocated a unique channel resource, the third reference signal that was estimated in accordance with the first reference signal estimated by the first estimating.

4. The channel estimating apparatus according to claim 1, wherein
   the first estimating by the processor further includes estimating in accordance with the fourth reference signal estimated by the second estimating, a reference signal that is in the first reference signal group and allocated the common channel resource.

* * * * *